United States Patent [19]

Masuo et al.

[11] Patent Number: 6,122,753

[45] Date of Patent: Sep. 19, 2000

[54] FAULT RECOVERY SYSTEM AND TRANSMISSION PATH AUTONOMIC SWITCHING SYSTEM

[75] Inventors: Hitoshi Masuo; Atsushi Iwata, both of Tokyo, Japan

[73] Assignee: NEC Corporation, Tokyo, Japan

[21] Appl. No.: 09/056,866

[22] Filed: Apr. 8, 1998

[30] Foreign Application Priority Data

| Apr. 9, 1997 | [JP] | Japan | 8-090416 |
| Apr. 9, 1997 | [JP] | Japan | 8-090417 |
| Apr. 9, 1997 | [JP] | Japan | 8-090418 |

[51] Int. Cl.[7] .................................................. H04L 1/22
[52] U.S. Cl. .............................. 714/4; 370/216; 370/217; 370/218; 370/225; 370/228
[58] Field of Search .............................. 714/4; 713/153; 370/216, 217, 218, 221, 225, 228

[56] References Cited

U.S. PATENT DOCUMENTS

| 5,402,478 | 3/1995 | Hluchyj et al. | 379/221 |
| 5,623,481 | 4/1997 | Russ et al. | 370/225 |
| 5,809,011 | 9/1998 | Almay | 370/218 |
| 5,832,197 | 11/1998 | Houji | 395/182.02 |
| 5,887,127 | 3/1999 | Saito et al. | 395/182.02 |
| 5,898,826 | 4/1999 | Pierce et al. | 714/4 |
| 5,903,545 | 5/1999 | Sabourin et al. | 370/225 |
| 5,953,312 | 9/1999 | Crawley et al. | 370/218 |
| 5,999,286 | 12/1999 | Venkatesan | 359/117 |
| 6,034,961 | 3/2000 | Masuo et al. | 370/395 |
| 6,041,037 | 3/2000 | Nishio et al. | 370/228 |

FOREIGN PATENT DOCUMENTS

| 465942 | 3/1992 | Japan . |
| 662001 | 3/1994 | Japan . |
| 7115420 | 5/1995 | Japan . |

OTHER PUBLICATIONS

Private Network–Network Interface Specification Version 1.0 (PNNI 1.0), Mar. 1996, *The ATM Forum Technical Committee*, pp. 13–46.

Primary Examiner—Robert W. Beausoliel, Jr.
Assistant Examiner—James G. Weir
Attorney, Agent, or Firm—Sughrue, Mion, Zinn, Macpeak & Seas, PLLC

[57] ABSTRACT

Setting of a bypass path upon occurrence of transmission failure, is applicable for large scale network. A system includes signaling means which makes judgment whether bypassing process is performed by an own node by a bypassing process judgement means when a release message issued upon occurrence of failure, is received. Upon judgment to perform bypassing process, computation of bypass path is requested by the path computing means. On the basis of result of computation, bypass path is established and switched. In the bypassing process judgment means, judgment is made whether bypassing process is performed by the signaling means or not depending upon the relationship of positions of the faulty portion and the own node.

13 Claims, 30 Drawing Sheets

○ : PHYSICAL NODE

△ : TERMINAL

○ : PHYSICAL NODE

△ : TERMINAL

○ : PHYSICAL NODE

△ : TERMINAL

| TO FROM | 3301 | 3302 | 3303 | 3304 | 3305 | 3306 |
|---|---|---|---|---|---|---|
| 3301 | — | *30 | — | 100 | — | — |
| 3302 | 30 | — | *40 | — | 10 | — |
| 3303 | — | 40 | — | 10 | — | *50 |
| 3304 | 100 | — | 10 | — | 20 | — |
| 3305 | — | 10 | — | 20 | — | 100 |
| 3306 | — | — | 50 | — | 100 | — |

(UNIT: Mbit/s)

(REMAINING USEFUL BAND IN LINK BETWEEN NODES 3301-3302 IS 30 Mbit/s, FOR EXAMPLE)

1

FAULT RECOVERY SYSTEM AND TRANSMISSION PATH AUTONOMIC SWITCHING SYSTEM

BACKGROUND OF THE INVENTION

1. Field of the Invention

The present invention relates generally to a fault recovery system. More specifically, the invention relates to a fault recovery system and a transmission path autonomic switching system for setting a path bypassing failure upon occurrence of failure in connection used in a connection oriented network using a protocol establishing line connection using a source routing system performing path calculation on the basis of a topological information exchanged between nodes.

2. Description of the Related Art

In the conventional connection restoring system using an ATM (asynchronous transfer mode) network of this kind, a concentrated management system unitarily managing network topology is provided so that the concentrated managing system collects network topology information from all of nodes for preliminarily calculating an auxiliary path for the purpose of lower delay in recovery of connection upon occurrence of failure.

In this condition, the concentrated management system employs a system for preliminarily setting the auxiliary path for a currently used connection upon setting of a certain connection, and transmitting a control signal for switching connection at respective nodes upon occurrence of failure.

On the other hand, the concentrated management system may also employ a system, in which a path calculation is performed for bypassing failure at the occurrence of failure without preliminarily setting the auxiliary path to establish a connection bypassing the failure.

In the foregoing construction of the network, the concentrated management system may manage topology information of the network. Therefore, the auxiliary path for the currently used path can be determined.

On the other hand, a technology not relying on the concentrated control system has been disclosed in Japanese Unexamined Patent Publication No. Heisei 4-65942, for example. In the disclosed system, each node has a plurality of predetermined auxiliary paths and normally monitors conditions of the auxiliary paths, and selects an appropriate path in predetermined condition upon occurrence of failure.

On the other hand, according to a system disclosed in Japanese Unexamined Patent Publication No. Heisei 6-62001, for example, a control frame is generated upon occurrence of failure to transmit the control frame for all of the connected paths so that the auxiliary path is determined by the node receiving the control frame.

On the other hand, by a system disclosed in Japanese Unexamined Patent Publication No. Heisei 7-115420, for all of nodes from a node connected to a calling terminal, a connection for management separate from a connection for a user is preliminarily set to recover the connection for management in autonomic discrete manner upon occurrence of failure, and then connection is switched by connecting network topology information utilizing management connection.

Furthermore, in a PNNI (Private Network-Network Interface) protocol in an ATM (asynchronous Transfer Mode) forum provision as the background art of the present invention, routing means for autonomously exchanging network topology information in respective nodes, and signaling means for setting connection to dynamically perform source routing in path determination, are defined. Upon occurrence of failure, faulty connection is maintained as cut off.

Among connection recovery system in the conventional ATM network set forth above, in a method unitarily managing network topology, when a failure is caused in the corresponding bypass path during actual use of the network, it becomes necessary to calculate other replacement path to require substantial period in large amount of calculation to cause a problem to require long period in processing information.

The reason is that the bypass paths for all of combinations have to be calculated to make algorithm complicate. On the other hand, since concentrated management is required, various information becomes large amount to require long period for processing.

On the other hand, in the system disclosed in the foregoing Japanese Unexamined Patent Publication No. Heisei 4-65942, it becomes necessary to set a plurality of auxiliary paths preliminarily. Thus, when a network construction is modified, large amount of process is required in updating process of the preliminary paths.

The reason is that when variation is caused in the network construction, variation may be caused in database of the auxiliary paths owned by all of nodes forming the network.

On the other hand, in the system disclosed in Japanese Unexamined Patent Publication No. Heisei 6-62001, upon performing switching process, overall network can be influenced.

The reason is that a particular control frame for path retrieval is generated and transmitted to all of paths due to occurrence of failure. Therefore, traffic of the control packet is inherently increased depending upon scale of the network.

On the other hand, in the method disclosed in Japanese Unexamined Patent Publication No. Heisei 7-115420, it becomes necessary for setting management connection between all of nodes. Upon occurrence of failure, relatively long period is taken in switching.

The reason is that management connection is required for exchanging network topology information and a procedure for at first recovering management connection at the occurrence of failure is required.

On the other hand, in a specification of a current ATM forum, when failure is caused, it becomes necessary to re-establish connection by superior application or the like without recovering connection. On the other hand, when failure is caused while connection is established with a plurality of Any Cast terminals providing certain predetermined services, it is frequently required to receive services from the beginning.

The reason is that, in the former case, means for recovering failure is not provided, and in the later case, since the service can be received by establishing with any Any Cast terminal, it is possible to establish connection with the Any Cast terminal different from the Any Cast terminal connected precedingly.

In the foregoing conventional fault recovery system in the ATM network, since switching is performed for connection in point-to-point connection, it is not possible to recover point-to-multi points connection.

The reason is that multi points connection is not considered. Namely, even though one connection can be recovered, a plurality of connections cannot be recovered.

Also, in the conventional connection switching system, in switching to be performed in response to occurrence of failure, even if good quality of path can be obtained in the bypassing path, if the quality demanded by the user upon setting of connection is minimum quality, the path is inherently used at the minimum quality even after switching. Conversely, when quality before switching is good, the same quality of connection is retrieved after switching to narrow path selection to lower probability of retrieval of the bypassing path.

The reason is that when failure is caused, recovery is attempted to establish bypass connection in the same quality as that in the preceding connection.

On the other hand, the conventional connection switching device performs switching at the occurrence of failure. When the quality demanded by the user upon establishing connection is the minimum quality in a range of quality, the user has to perform communication in the same quality until connection is shut off.

The reason is that there is not means for modifying the quality once demanded by the user within a possible range of quality until the current connection is shut off. At this time, since the quality of connection falls within a demanded range, it is not regarded that failure is caused. Thus, switching is not performed.

SUMMARY OF THE INVENTION

It is an object of the present invention to provide a fault recovery system which can facilitate management of switching in a large scale network, simplify management of switching and realize recovery of faulty connection in switching per se at early timing by making management of bypass paths upon occurrence of failure by stratification and flexibly modifying nodes to switch depending upon the content of failure, in the logically hierarchically managed network.

Another object of the present invention is to provide a fault recovery system which can realize continuity of service by establishing connection with an Any Cast terminal, to which connection is established before occurrence of failure, even when failure is caused during service in the Any Cat terminal.

A further object of the present invention is to provide a fault recovery system in a communication network, which enables realization of recovery upon occurrence of failure in a connection established as a multi point connection.

A still further object of the present invention is to provide a transmission path autonomic switching system, in which a new quality of connection is set after switching as long as the quality is within a range demanded by a terminal, upon path switching in failure recovery, for improving use efficiency of the network, and the path can be switched even after once establishing path connection when a path with better quality of connection within the quality range demanded by the user, for improving quality of connection by the user.

According to the first aspect of the present invention, a fault recovery system in a connection oriented network employing a protocol establishing line connection using a source routing system which performs path computation on the basis of a topology information exchanged between nodes, for establishing a path bypassing a failure upon occurrence of failure in connection used in the network, the node comprises:

first release message receiving means for receiving a release message generated upon occurrence of failure;
bypassing process judgment means for making judgment whether a bypassing process is primarily performed by an own node or not depending upon a relationship of positions of a faulty portion indicated in the release message and the own node;
path computing means for performing path computation excluding the faulty portion when the bypassing process judgment means makes judgment that the bypassing process, in which the own node becomes a master, is to be performed;
setup message transmitting means for transmitting a setup message added an information of the faulty portion, for establishing a bypass path on the basis of bypass path information obtained by the path computing means when the bypassing process judgment means makes judgment that the bypassing process, in which the own node becomes a master, is to be performed;
switching means for performing switching by connecting the bypass path established by the setup message and a path in a direction toward a terminal not causing failure from the own node; and
first release message transmitting means for abandoning the release message in responsive to completion of switching by the switching means, and for transmitting the release message in a direction toward a terminal when switching is not completed.

The node may further comprise:

second release message transmitting means, provided in place of the first release message transmitting means, for transmitting a release message with information indicative of on going state of switching by adding a content that the own node is in process for switching, to the release message when the release message is received, and transmitting a result message indicative of the result of switching process by the switching means of the own node; and second release message receiving means for receiving the release message with the information indicative of on going state of switching or the result message, and the switching process is performed by computing a bypass path by the path computing means for preparation to switching upon reception of the release message with the information indicative of on going state of switching, transmitted from other node, and upon reception of the result message indicating that switching is not completed.

According to the second aspect of the invention, a fault recovery system in a connection oriented network employing a protocol establishing line connection using a source routing system which performs path computation on the basis of a topology information exchanged between nodes, for establishing a path bypassing a failure upon occurrence of failure in connection used in the network, the node comprises:

first setup message receiving means for receiving a release message generated upon occurrence of failure or a setup message added information of a faulty portion;
bypassing process judgment means for making judgment whether a bypassing process is to be primarily performed by an own node or not depending upon a relationship of positions of a faulty portion indicated in the received message and the own node;
a timer to be triggered when the release message is received and the setup message is node received and stopped upon reception of the setup message;
connection state judgment means for making judgment whether a connection, in which failure is caused, is remained in the own node when the timer is not time out and the setup message is received;

switching means for performing switching by connecting the bypass path established by the setup message and a path in a direction toward a terminal not causing failure from the own node when the connection state judgment means makes judgment that the connection causing failure is remained; and third release message transmitting means for transmitting the release message in responsive to time out of the timer, and for abandoning the release message when the timer is not cause time out.

The node may further comprises fourth release message transmitting means for transmitting the release message to the path in a direction of occurrence of failure of connection where failure is caused when switching by the switching means is completed. An address of a node, to which a destination terminal of connection is connected, may be held upon establishing a connection demanded from a calling terminal. A plurality of switching portions for switching failure upon occurrence of failure of connection may be provided and re-connection is established with the destination terminal, to which connection is established before occurrence of failure.

According to the third aspect of the present invention, a fault recovery system in a connection oriented network employing a protocol establishing line connection using a source routing system which performs path computation on the basis of a topology information exchanged between nodes, for establishing a path bypassing a failure upon occurrence of failure in a multi-point connection for establishing connection for a plurality of terminals, the nodes comprises:

management judgment means for making judgment whether management of terminals involved in multi-point connection under management of own node, upon setting of multi-point connection;

a database storing a management information when judgment is made that management is to be performed by the management judgment means;

notifying means for notifying a management information of the database to nodes to be candidate for performing management of other terminals involved in multi-point;

bypassing process judgment means for making judgment whether a bypassing process is to be performed by an own node or not depending upon a relationship of positions of a faulty portion and the own node;

path computing means for performing path computation excluding the faulty portion for connection managed by the own node on the basis of information held in the database when the bypassing process judgment means makes judgment that the bypassing process is to be performed;

path establishing means for establishing the bypass path on the basis of the bypass path information obtained by the path computing means when bypassing process is to be performed by the bypass process judgment means; and switching means for performing switching between the bypass path and the path where failure is caused.

The node recovers multi-point connection, in which failure may be caused by the path computing means, the path establishing means and the switching means on the basis of information of the database when judgment is made to perform management by the management judgment means, in response to reception of message for bypass path setting.

The management judgement means may make judgement to perform management of the terminal involved in multi-point under management of the own node, when the own node is the node closest to the calling terminal on the connection in a node group as a predetermined local management unit. The bypass process judgment means may make judgment to perform the bypass process when the own node is a starting point node or when the own node is located between the faulty portion and the calling terminal.

According to the fourth aspect of the present invention, an autonomic switching system of transmission path in a connection oriented communication network using a protocol performing line connection using a source routing system performing path computation on the basis of topology information exchanged between nodes, wherein the node comprises:

demanded quality holding means for holding demanded quality information having a predetermined range of quality demanded by a terminal upon setting of connection;

path computing means for computing bypass path having a quality within a demanded quality range held by the demanded quality holding means in response to occurrence of connection failure; and switching means for switching to a bypass oath obtained by the path computing means.

The node may further comprise means for retrieving a path having better quality than the path on use within a range of quality demanded by the terminal by triggering the path computing means at every predetermined period, to switch the retrieved oath by the switching means when path can be retrieved. The quality may be an information indicative of transmissible band of the path.

With the construction set forth above, in the large scale network, in which logical hierarchy is established, management of switching is simplified to flexibly determine the nodes to be switched depending upon the content of the failure to make it possible to switch with small delay. On the other hand, upon connection to Any Cast terminal, even when failure is caused, connection with the same Any Cast terminal as that before occurrence of failure, can be established.

On the other hand, judgment is made whether the own node can be the representative multi-point processing node upon setting of connection. Then, management information of the terminals involved in multi-point connection under management in the representative multi-point processing node is noticed to other multi-point processing nodes to compute bypassing path of the terminals involved in the multi-point upon occurrence of failure for switching bypassing path by setting the bypass path for the bypass path. Thus, for multi-point connection, connection can be recovered upon occurrence of failure.

Furthermore, upon retrieval of the bypass path upon occurrence of failure, retrieval is performed within a range of line quality demanded from the calling terminal to permit flexible retrieval of the bypass path upon occurrence of failure to enhance certainty of retrieval of the bypass path. On the other hand, computation of other path is regularly performed so that when obtained path has better quality than current path, the path is switched to constantly provide better quality of connection for the user.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 5:
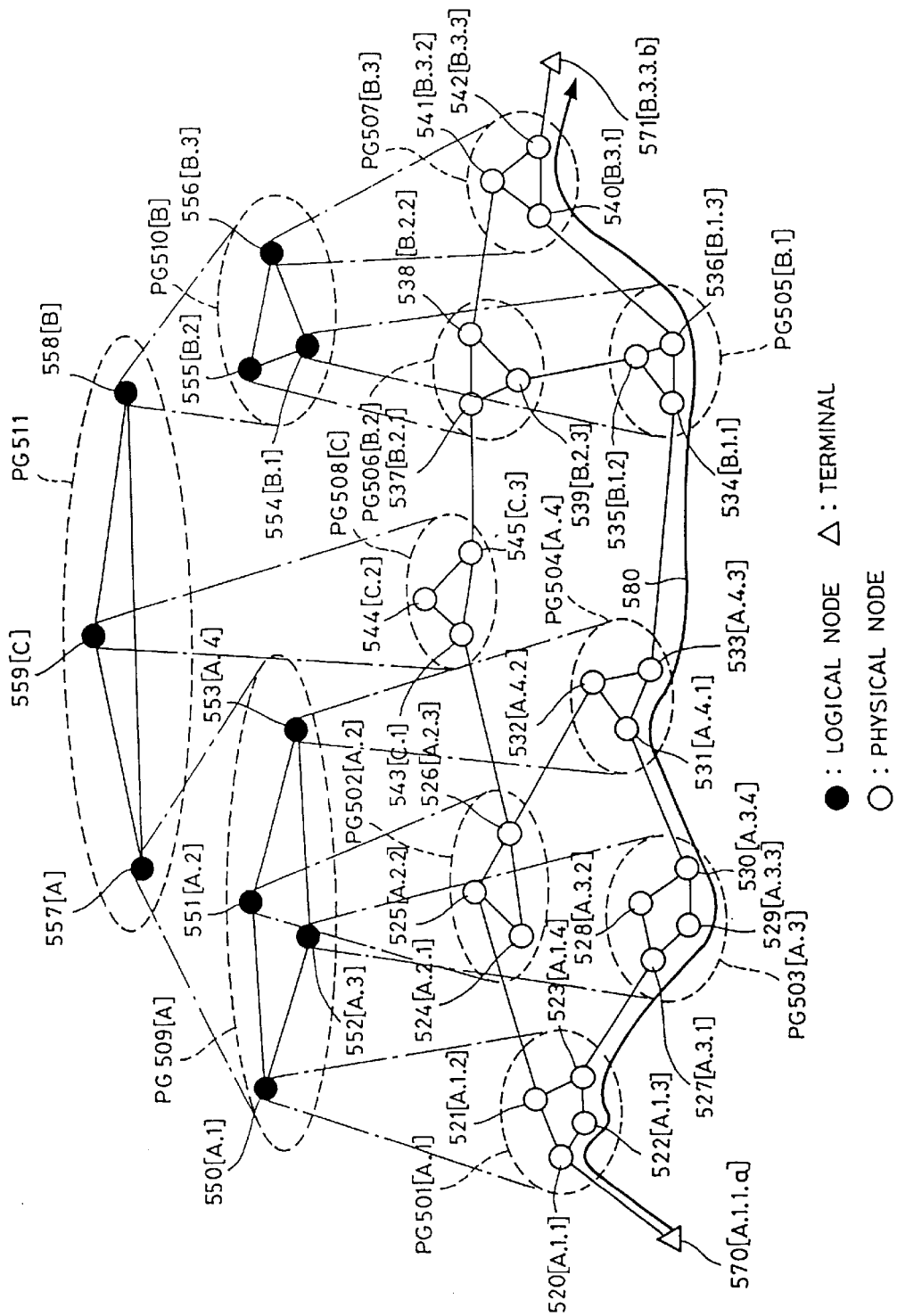
FIG. 5 is an illustration showing an example of construction of hierarchically established net work according to the present invention.

At first, referring to FIG. 5, FIG. 5 shows a network based on a PNNI protocol defined by the ATM forum as an example realizing a connection oriented network using a protocol performing circuit connection using a source routing system performing path calculation on the basis of a topology information exchanged between nodes. Particularly, there is shown a logically hierarchically managed network.

Using FIG. 5, brief discussion will be given for a construction of a network using the PNNI protocol and a routing technology as a mechanism for exchanging topology information. The PNNI protocol is a provision of a routing table technology for exchanging topology information of the network and a signaling technology for establishing connection.

FIG. 5 is assumed that there are eight different managing sub-networks (PG) 501 to 508 [A.1, A.2, A.3, A.4, B.1, B.2, B.3, C], each consisted of three to four physical nodes. Respective PG 501~502, 501~503, 502~504, 502~508, 503~504, 504~505, 505~506, 505~507, 506~507, 506~508 are connected by physical links.

In order to efficiently exchange topology information of the overall physical network, PG509 and PG510 [A, B] of hierarchy of one upper layer in logical sense are provided, and PG511 of hierarchy further one upper layer is provided. Then, at PG509, PG501 to PG504 [A.1, A.2, A.3, A.4] of lower hierarchical layer are expressed as respectively one logical nodes 505 to 553 [A.1, A.2, A.3, A.4]. At PG510, respective of 507 to 507 [B.1, B.2, B.3] are expressed as respectively one logical nodes 554 to 556 [B.1, B.2, B.3].

On the other hand, at PG511, PG508 to PG510 [A, B, C] are respectively expressed as respective one logical nodes 557 to 559 [A, B, C]. In practice, the function of the logical node is performed by any one of the physical node in the PG of the lowermost hierarchical layer.

Here, on respective of nodes and terminals, ATM addresses are assigned. Signs shown in the brackets ([ ]) are the ATM addresses. For the ATM addresses, attention has been paid for establishing hierarchy. For example, the ATM address of the logical node 550 is [A.1]. From this information, it can be appreciated that the logical node 550 belongs to PG509[A], and also appreciated that the logical node 550 is connected to a node 520 [A.1.1] at a terminal 570 [A.1.1.a]. Routing is a technology for exchanging network topology information by exchanging message for routing between all nodes adjacent to own node in the PGs in the lowermost hierarchical layer. When the exchanged topology information is different in content from the topology information database of the own node, the content of the database is updated when judgment is made that updating is necessary under a provision. Also, when it is necessary to transfer the received topology information to other node, the topology information is transferred. This mechanism is called "flooding".

Figure 6:
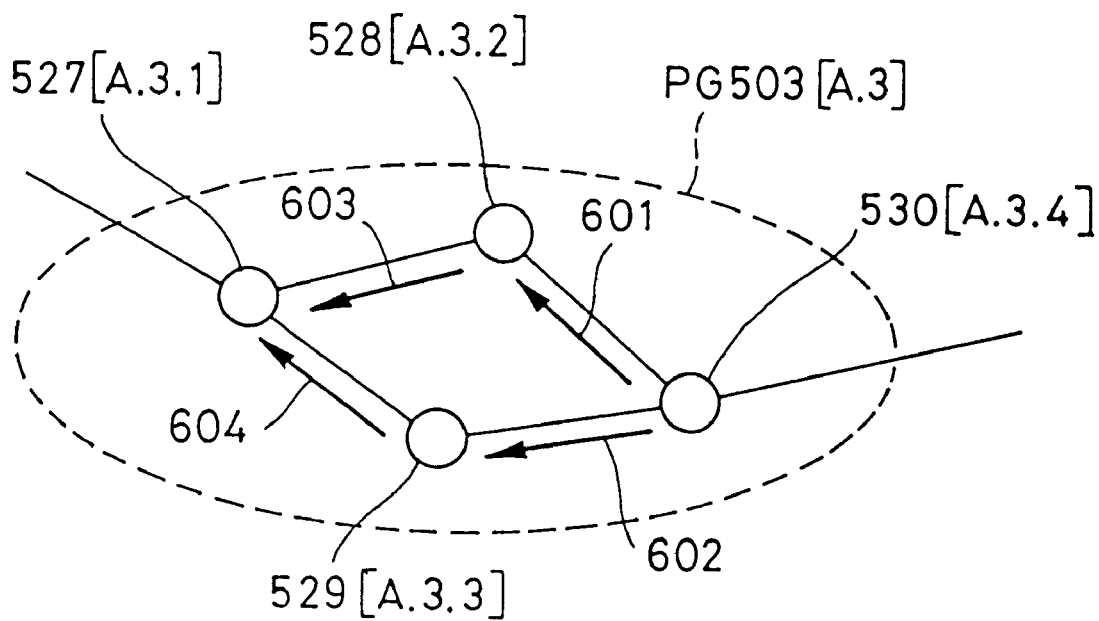
FIG. 6 is an illustration showing an example of flooding.

For example, as shown in FIG. 6, when variation of topology is recognized at the node 530 [A.3.4], the information is transferred to the node 528 [A.3.2] and the node 529[A.3.3] at the first stage (601, 602), and to the node 527 [A.3.1] at the second stage (603, 604). Thus, the physical nodes of the PG503 [A.3] can detect information concerning what topology is established by all nodes in the PG503 in complete form.

On the other hand, between PG, topology information is exchanged by exchanging information between the logical nodes within PG of the upper hierarchical layer. At this time, since the topology information is exchanged in compressed form, the detailed topology information of inside of other PG is not recognized. For example, for the physical node 520 [A.1.1], it is not possible to know a state of connection of 524 [A.2.1], 525 [A.2.2] and 526 [A.2.3] within other PG502 [A.2] cannot be recognized. It should be noted that the topology information exchanged between the logical nodes of the PG in the upper hierarchical layer is also noticed to the nodes in the PG of the lower hierarchical layer.

By sequentially performing exchanging of topology information between the physical nodes and the logical nodes in all of PGs, all nodes in the network finally holds topology information of the network in the topology information database in respective nodes.

On the other hand, signaling is a technology to perform setting of connection on the basis of the path to a destination terminal when a Setup message is received from a calling terminal, in the physical node connected to the calling terminal (namely a entry node). As set forth above, since all topology can be recognized within the same PG by the routing, the complete path can be determined. On the other hand, concerning other PG, the path is determined using topology information of the PG in the upper hierarchical layer.

For example, a path from the calling terminal 570 [A.1.1.a] to the destination terminal 571 [B.3.3.b] is calculated in such a manner that the node 520 [A.1.1] as the starting node judges that the destination terminal 571 belongs 558 [B] on the basis of the ATM address [B.3.3.b] of the destination terminal to calculate the path to 558 [B]. The content at this time becomes [A.1.1→A.1.3→A.1.4] [A.1→A.2] [A→B]. Then, in the nodes within the same PG501 [A.1], the Setup message is noticed to the next node in the sequential order as computed in the starting node 520 [A.1.1]. In the connection beyond the PG, the path information for the next PG is generated at the node at the entrance (PG entry border node) of the next PG.

For example, in the PG entry border node 527 [A.3.1] in the PG503 [A.3], computation is performed as [A.3.1→A.3.3→A.3.4]. By repeating this in each PG, the Setup message is noticed to the node (exit border node) connected to the destination terminal. Finally, the exit border node sets connection to the destination terminal 571 [B.3.3.b]. The path at this time is as shown by 580.

Figure 1:
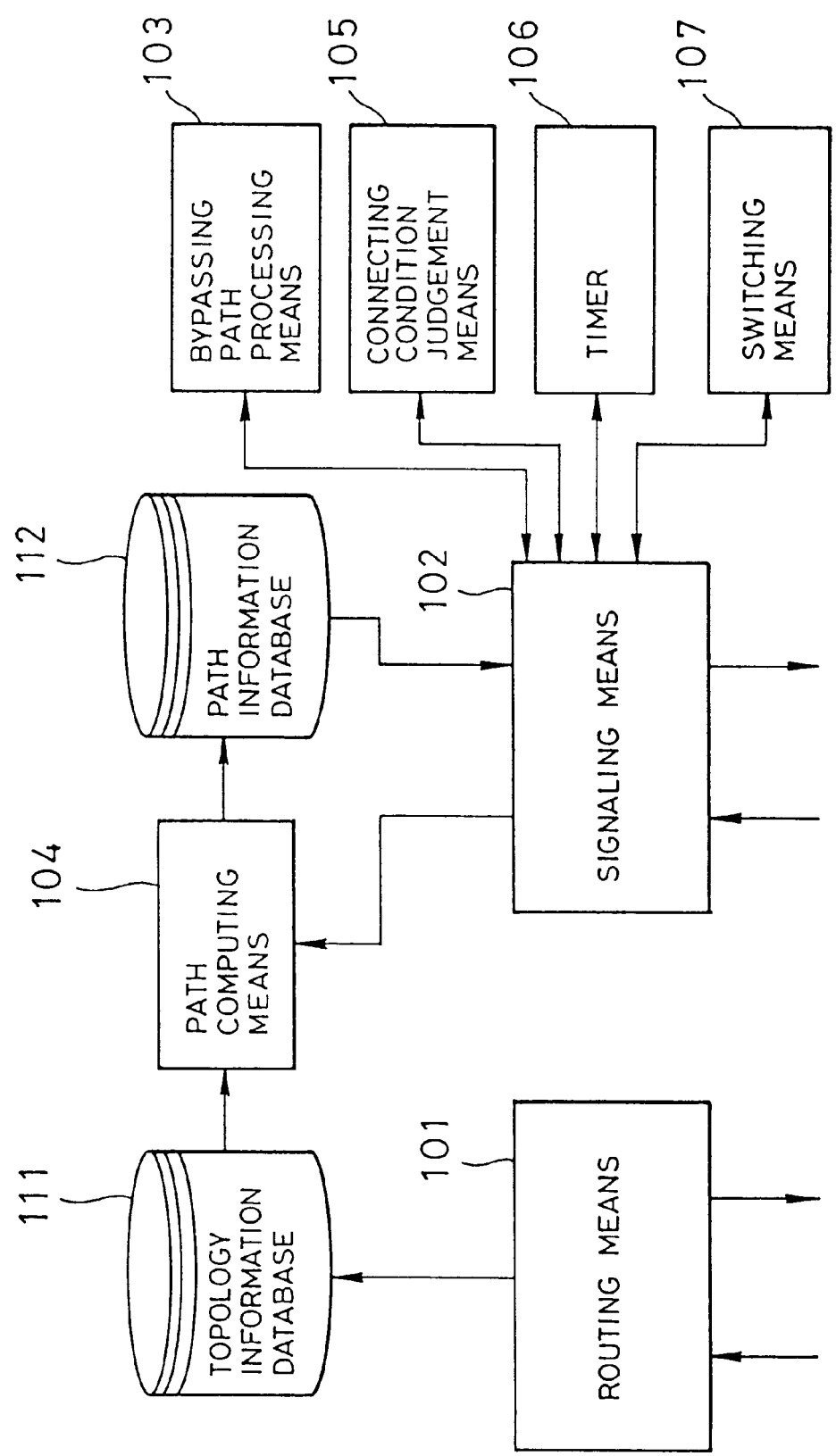
FIG. 1 is an illustration showing a functional construction of one embodiment of a fault recovering system according to the present invention.
Figure 2:
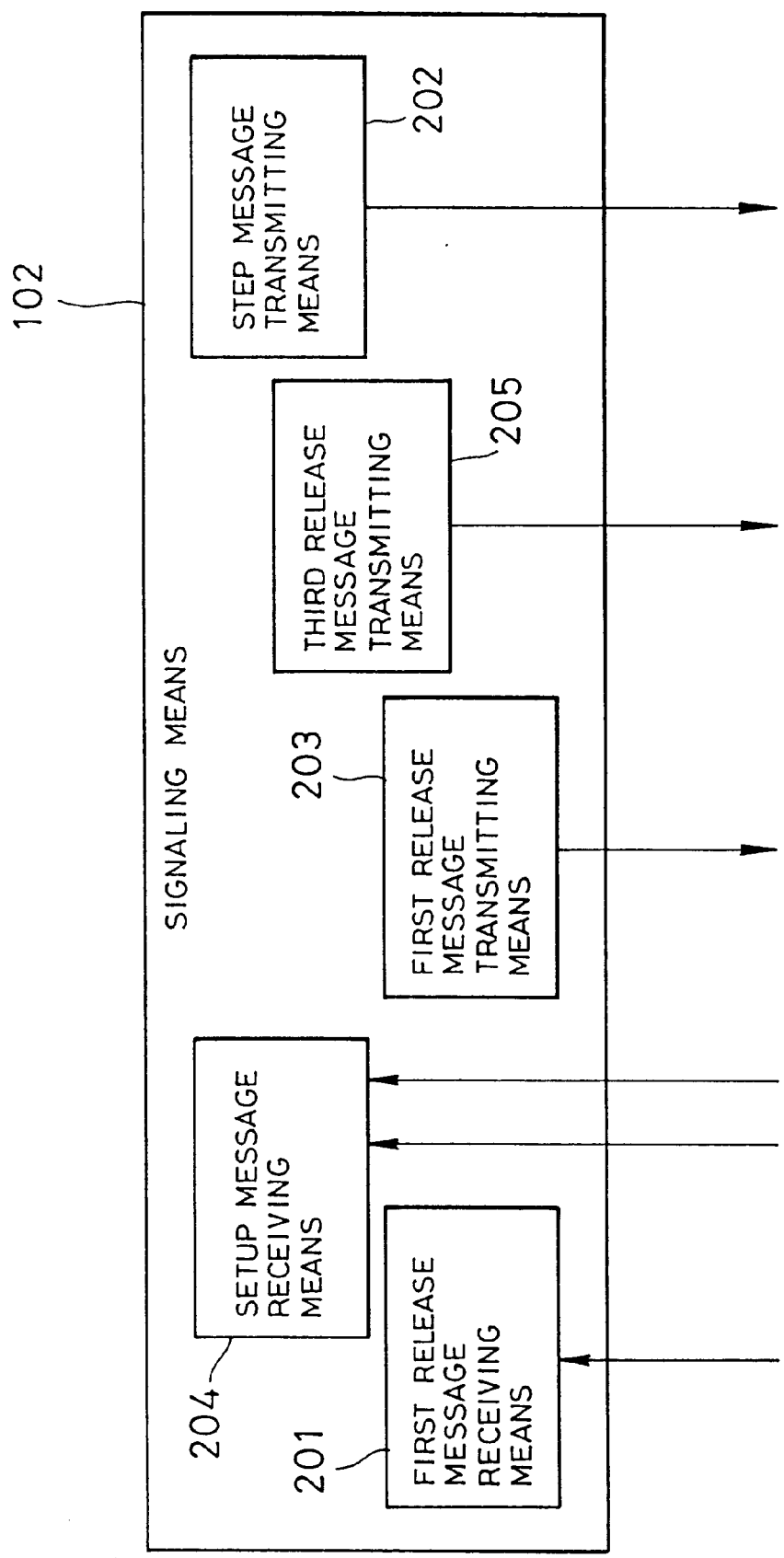
FIG. 2 is a block diagram showing one functional construction of a signaling means of the fault recovery system of FIG. 1.

FIGS. 1 and 2 are functional block diagrams of one embodiment of the fault recovery system according to the present invention. In FIGS. 1 and 2, there are illustrated major components provided in the node.

FIG. 1 shows the overall construction. The node includes a routing means 101, a signaling means 102, a bypass process judgment means 103, a path computing means 104, a connecting condition judgment means 105, a timer 106, a switching means 107, a topology information database 111, a path information database 112.

On the other hand, FIG. 2 shows a detailed construction of the signaling means 102 in FIG. 1. The signaling means 102 includes a first Release message receiving means 201, a Setup message transmitting means 202, a first Release message transmitting means 203, a Setup message receiving means 204 and a third Release message transmitting means 205.

The routing means 101 has a protocol having the same specification as a PNNI routing protocol defined by the ATM forum set forth above. The routing means 101 exchanges topology information by exchanging a routing message between own node and the adjacent node. If exchanged topology information is different from the topology information database 111 of the own node, when judgment is made that updating is necessary according to the provision, the content of the topology information database is updated. If flooding is necessary, flooding is performed. Similarly, the node also serving as the logical node of the PG of the upper hierarchical layer exchanges the compressed network topology information with the adjacent logical node in the PG of the upper hierarchical layer.

The signaling means 102 mainly performs two process. One is a process for setting and disconnecting of connection in response to a demand from the terminal. Another process is a process for disconnecting or re-setting of connection due to occurrence of failure in the network. Since process functions are differentiated depending upon positions of the nodes in the connection path, the foregoing process will be discussed separately for the entry node, the PG entry border node, the node of the outlet of the PG (PG exit border node), the exit border node and other nodes (intermediate nodes).

At first, discussion will be given for process of connection setting or disconnecting in response to the demand from the calling terminal, as the first process of the signaling means 102.

In the entry node, upon reception of the Setup message concerning path setting from the calling terminal by the Setup message receiving means 204, the signaling means 102 notices that path computation is necessary, to the path computing means 104. The signaling means 102 performs connection process of connecting in the own node on the basis of the path information of the path information database 112 set by the path computing means 104. For the node as the next destination of connection on the path information, the Setup message is transmitted by the Setup message transmitting means 202. As set forth above, the path information, at this time, represents the path in the complete form in the same PG and only represents the path in the PG of the upper hierarchical layer in other PG.

Next, in the PG entry border node, upon reception of the Setup message by the Setup message receiving means 204, the path information set in the message represents only path in the PG of the upper hierarchical layer. Therefore, the PG entry border node computes the path within the PG, in which the own node belongs. This process notices that path computation by the signaling means 102 is necessary, to the path computing means 104.

The signaling means 102 performs information processing of connection in own node on the basis of the path information of the setting information database 112 by the path computing means 104. In conjunction therewith, for the node as next connecting destination on the path information, the Setup message is transmitted by the Setup message transmitting means 202.

In the PG exit border node, the exit border node and the intermediate node, when the Setup message is received by the Setup message receiving means 204, connection process of connection in the own node is performed. On the basis of the path information in the Setup message, for the next node or the destination terminal, Setup message is transmitted by the Setup message transmitting means 202.

On the other hand, in all of the nodes, upon reception of a Release message concerning shut off of the path in response to the demand from the terminal by the Release message receiving means 201, a Release message is transmitted to the node as next connection destination on the path by the first Release message transmitting means 203. Also, disconnecting process of corresponding connection of the own node is performed.

Next, discussion will be given for a process for disconnecting and re-setting of connection by failure occurring within the network, as a point of the present invention.

At first, at the node, in which failure is detected within the network, the Release message is noticed in the direction of the terminal, in which the failure is not caused on the path. The Release message includes information of the faulty portion, the content of which is partly different from the Release message by the shut-off demand from the foregoing terminal.

The entry node or the PG entry border node, upon reception of the Release message due to occurrence of failure by the first Release message receiving means 201, requests the bypassing process judgement means 103 to judge whether bypassing process is to be performed mainly for performing bypassing process by the own node. When judgment is made judgment means 103 that bypassing process is not performed by the bypassing process, the same process as that of the intermediate node is performed. Conversely, when judgment is made that bypassing process is to be performed, path computation is required for the path computing means 104 for removing the portion, in which failure is caused.

Then, on the basis of the obtained path information, the Setup message for bypassing path setting is transmitted with adding information indicative of the faulty portion by the Setup message transmitting means 202 and the bypass path is established.

When the bypassing path is established and switching by the switching means 107 is completed, the Release message due to occurrence of failure is abandoned. On the other hand, when the bypassing path cannot be established and thus switching cannot be completed, the Release message is transmitted in the direction of the terminal causing failure.

On the other hand, upon reception of the Setup message for connection bypassing path, connection process for connecting in own node is performed. In conjunction therewith, on the basis of path information in the message, the message is transmitted for the node located at a position to be the next node.

The signaling means 102 in the PG exit border node and the exit border node request judgment whether bypassing process to be secondary is to be performed or not in bypassing process by own node to the bypassing process judgment means 103, when the Release message due to occurrence of failure is received.

When judgment that the bypassing process is not to be performed by the bypassing process judgment means 103, the same process as the repeat node is performed. When judgment that the bypassing process is to be performed, and when the Setup message for bypass path is not received at that timing, a timer 106 is initiated an timer operation. Subsequently, when the Setup message is received, the timer 106 is stopped. Then, switching process is performed to abandon the Release message.

If the Setup message for setting of bypass path is received and switching is completed upon reception of the Release message, the Release message is abandoned. On the other hand, the timer 106 causes time out, the Release message is transmitted in the direction of the terminal not causing failure utilizing the third Release message transmitting means 205.

On the other hand, in the signaling means 102 of the PG exit border node and the exit border node, checking is requested to the connecting condition judgment means 105 whether connection, in which failure is caused, is yet present in the own node. In the connection condition judgment means 105, connection is still present, namely, whether the Release message is received or not, or in the condition where the timer 106 does not cause time out receiving the Release message, the switching process is performed by the switching means 107.

When connection is not present, namely the timer 106 is not time out after reception of the Release message, on the basis of the path information in the Setup message, at the PG exit border node, the Setup message for bypass path setting is transmitted to the next node. On the other hand, at the exit border node, judgment is made that bypassing process is not possible to abandon the message.

In the intermediate node, when the Release message due to occurrence of failure is received, the Release message is transmitted to the node located at the position to be the next node on the path, to perform disconnection of corresponding connection in the own node. On the other hand, upon reception of the Setup message for connection bypassing path, connection process of connection in the own node is performed and the message is transmitted to the node to be next on the basis of the path information in the message.

The bypass process judgment means 103 identifies the position of the network of the own node by the content of management of the hierarchy. Here, in case of the starting end node, the position of the own node is the node to primarily perform bypassing process, and in case of the exit border node, the position of the own node is the node to perform bypassing process to be secondary. On the other hand, in case of the PG entry border node, the position of the own node is the node to be candidate for primarily bypassing process, and in case of the PG exit border node, the position of the own node is the node to be candidate for secondary bypassing process. The PG exit border node may be neglected from the candidate nodes for bypassing process.

Then, how the candidate nodes determine the node to perform bypassing process is, since the portion in the network where failure is caused, can be recognized from the content of the Release message due to occurrence of failure, for example, can be determined based on the information of the faulty portion and by recognizing the direction toward the calling terminal in the connection.

Namely, when the own node is located between the faulty portion and the calling terminal, the own node primarily performs the bypassing process. Conversely, when the own node is located between the faulty portion and the destination terminal, the bypassing process is performed subsidiarily. If the position of the own node does not correspond either case, the own node is considered to be the repeat node. Here, FIG. 7 shows one example of the judgment flow of the bypass process judgment means 103.

Figure 7:
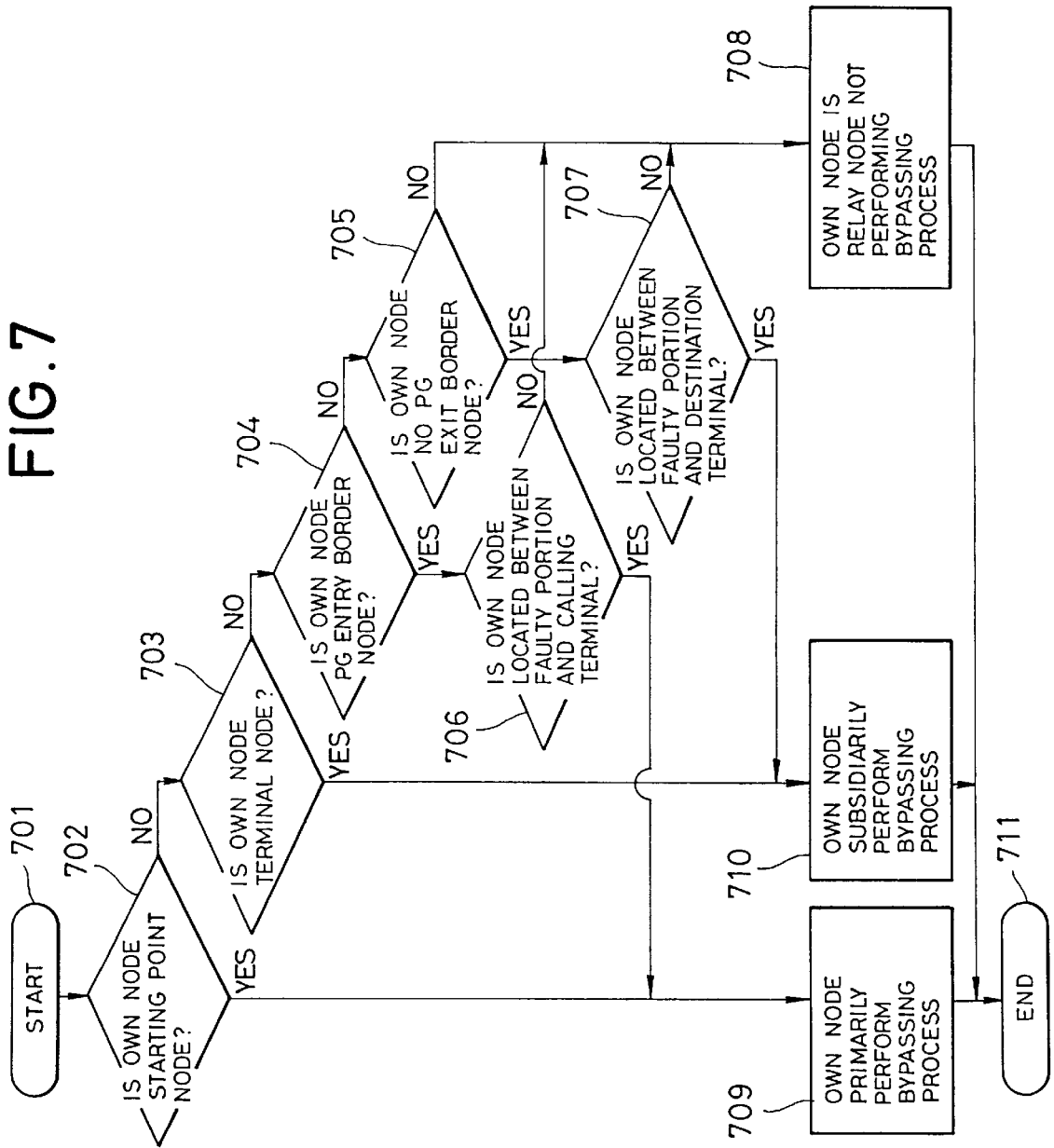
FIG. 7 is a flowchart for making judgement in a bypass process judgment means.

In FIG. 7, steps 702 and 709 are processing flow of the entry node, steps 703 and 710 are processing flow of the terminating node, and steps 704, 706 and 709 are processing flow of the PG entry border node. Steps 705, 707 and 710 are processing flow of the PG exit border node, and step 708 is processing flow of the relay not performing bypassing process.

The path computing means 104 performs the path computation on the basis of the address of the designation terminal and topology information database 111. As an example of method of the path computation, a known Dijkstra algorithm computing the shortest path and so forth may be used. Then, the result is set in the path information database 112. On the other hand, the path computation upon occurrence of failure is performed eliminating the faulty portion.

When the Setup message for setting the bypass path is received, the connecting condition judgment means 105 makes judgment whether corresponding faulty connection is still present in the own node. For example, when setting of connection by the demand from the terminal is performed, a unique connection identifier is given in the network. In the node, on which bypassing process on the connection is performed and in candidate node, unique connection identifier is maintained per each connection.

When the failure occures, the repeat node primarily performing the bypassing process transmits the Setup message for bypassing process with adding the connection identifier of connection therein. Then, on the basis of the Setup message, presence of connection within the own node can be detected by whether connection having the same connection identifier as that added to the Setup message is present in the own node or not.

The timer 106 is triggered when the Setup message for bypassing process is not received upon reception of the Release message due to occurrence of failure. Conversely, when the Setup message is already received, the timer 106 is stopped. On the other hand, then the timer 106 causes time out, the fact is noticed to the signaling means. The switching means 107 establishes connection between the path established by the Setup message and the path, in which failure of connection is not caused.

Figure 3:
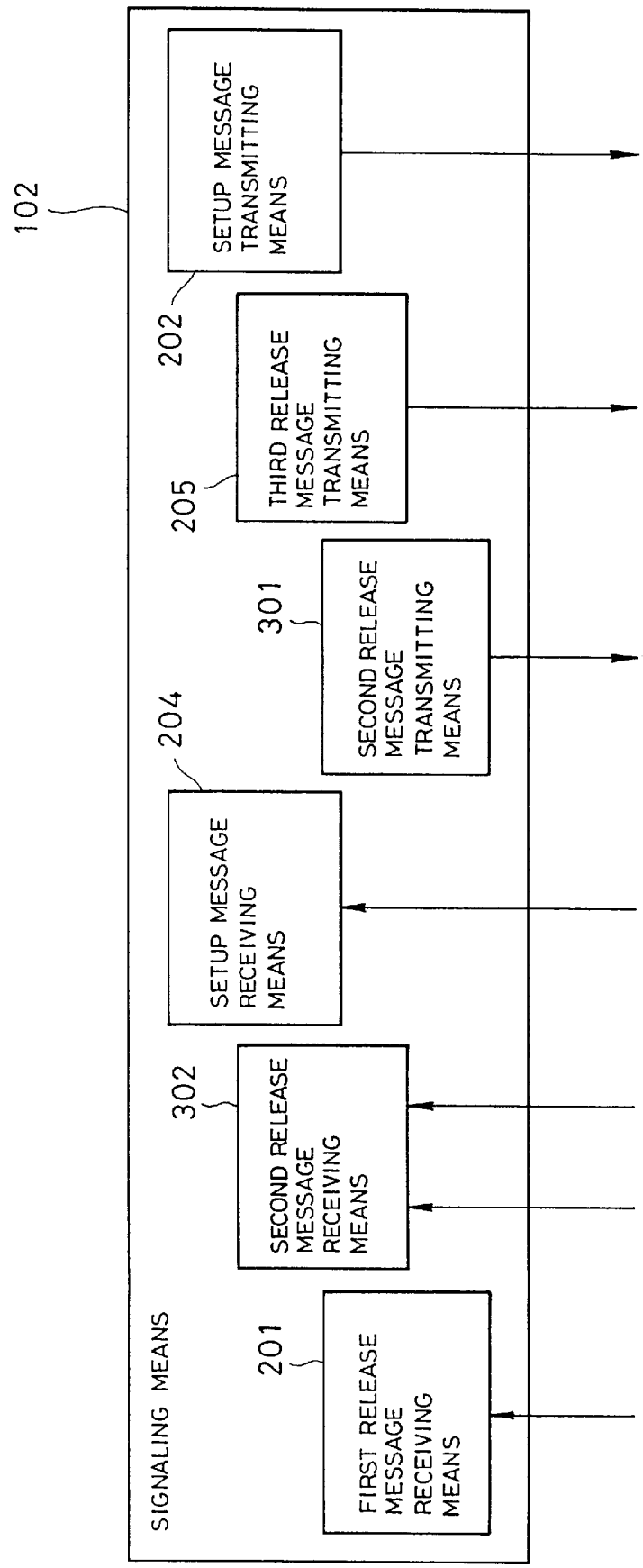
FIG. 3 is a block diagram showing another functional construction of a signaling means of the fault recovery system of FIG. 1.

Next, discussion will be given for the second embodiment of the fault recovery system according to the present invention. The overall construction becomes the same as that discussed with reference to FIG. 1. The construction of the signaling means 102 is as shown in FIG. 3 and comprises a second Release message transmitting means 301, a second Release message receiving means 302, the first Release message receiving means 201, the Setup message transmitting means 202, the Setup message receiving means 204 and the third Release message transmitting means 205.

A difference of the second embodiment from the first embodiment set forth above, appears upon disconnection and re-setting of connection due to occurrence of failure as the second process of the signaling means 102, particularly in case of the entry node or the PG entry border node. Other processes in the second embodiment are the same as those in the first embodiment.

When the Release message not containing information being in switching process is received by the first Release message receiving means 201, the Release message with the information being in fault recovery process added the information being in switching process, is noticed in the direction of the terminal not causing failure in the second message transmitting means 301. Subsequently, request for computation and switching of the bypassing path are performed.

Then, when the bypassing process is established and switching is completed, a result message indicative of completion of the bypassing process is transmitted by the second message transmitting means 301. On the other hand, when switching cannot be completed, the result message indicative that bypassing process cannot be completed is transmitted by the second message transmitting means 301.

On the other hand, when the Release message with the information being in switching process, transmitted to other node, is received by the second Release message receiving means 302, computation of the bypassing path is requested to the path computing means 104. At this stage, the process is interrupted once so that judgment whether switching process is actually required or not at this stage to execute the process. In the alternative, before receiving the result message, the Setup message for bypassing path setting is transmitted to establish the bypassing path for switching upon arrival of the result message.

In this case, since it is not determined whether the bypassing path is actually used or not, it becomes necessary to notice that the bypass path is to be used by new message when the bypass path is to be used.

Namely, when the received Release message represents that the switching process is in progress, the bypassing processing is currently in process by other primary fault recovery system. Therefore, it means that while the bypass path is computed in the own node, whether switching is actually performed or not is determined depending upon results of bypassing process in the node which is currently in progress of switching process.

Figure 4:
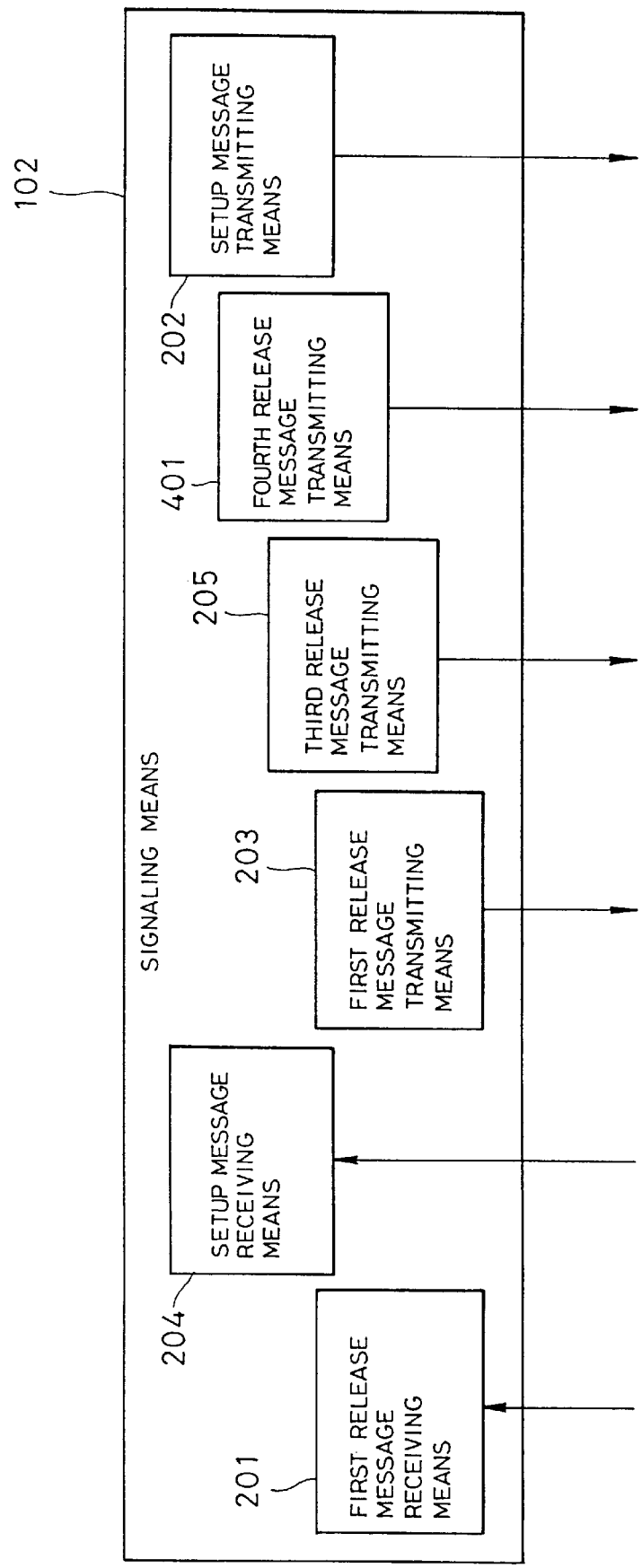
FIG. 4 is a block diagram showing a further functional construction of a signaling means of the fault recovery system of FIG. 1.

Next, discussion will be given for the third embodiment of the fault recovery system according to the present invention. The overall construction is the same as that of FIG. 1. The signaling means 102 is constructed by adding a fourth Release message transmitting means 401 for the construction shown in FIG. 2, as shown in FIG. 4.

The fourth Release message transmitting means receives a Setup message and transmits a Release message for disconnecting the connection in the direction to the existing faulty connection where failure is caused, when switching process is performed.

Next, discussion will be given for the fourth embodiment of the fault recovery system according to the present invention.

Figure 8:
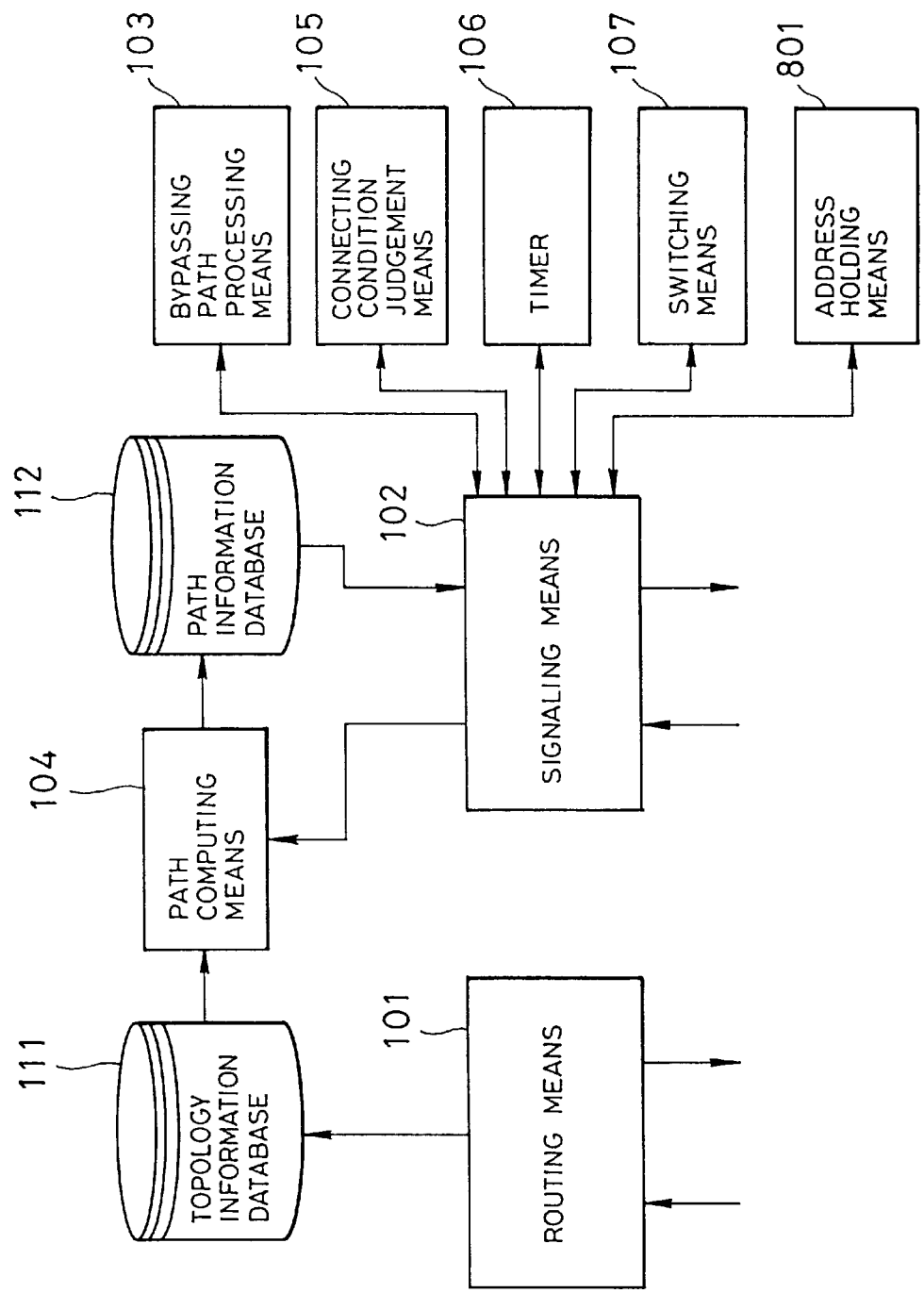
FIG. 8 is an illustration showing a functional construction of another embodiment of a fault recovery system according to the present invention.

The overall construction of the fourth embodiment of the fault recovery system is shown in FIG. 8. The shown embodiment is constructed by adding an address holding means 801 holding the ATM address of the exit border node, for the construction shown in FIG. 1. The connect message as a response to the Setup message upon setting of connection is transmitted with adding the ATM address in the exit border node, and this ATM address is held in the intermediate fault recovery system.

Next, operation of the overall process in the preferred embodiments of the fault recovery system according to the present invention will be discussed in terms of particular example of two failure caused in the ATM network of FIG. 5, with reference to FIGS. 9 to 14.

At first, discussion will be given for the case 1 of failure, in which failure is caused in a ling of node 527 [A.3.1]~the node 529 [A.3.3].

Figure 9:
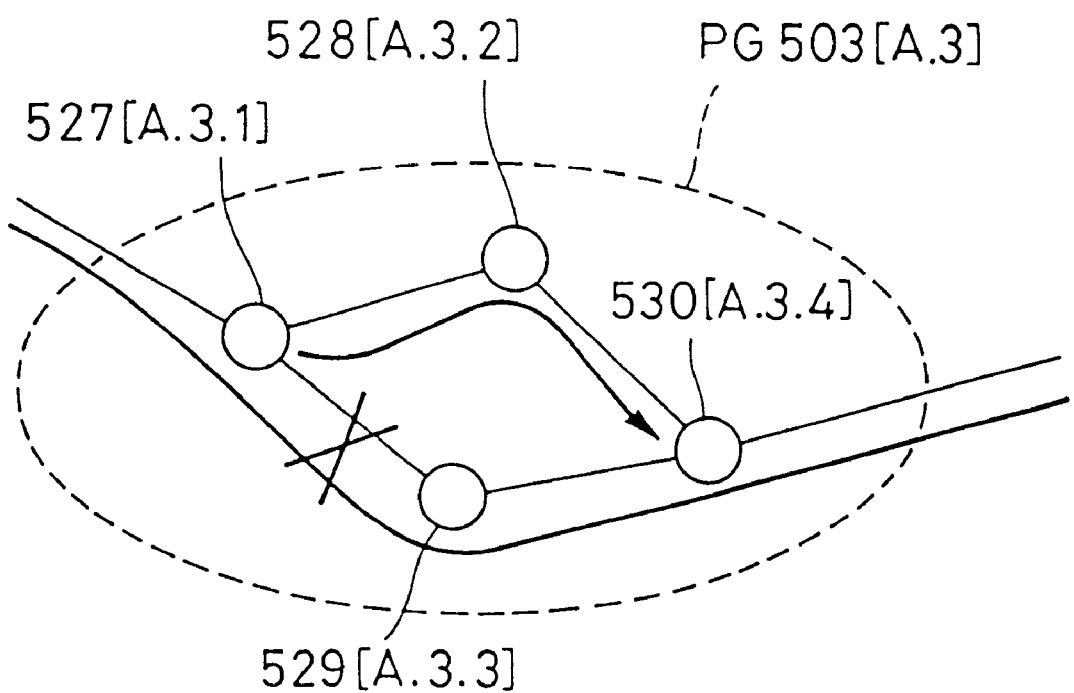
FIG. 9 is an illustration showing an example of failure in the network.
Figure 11:
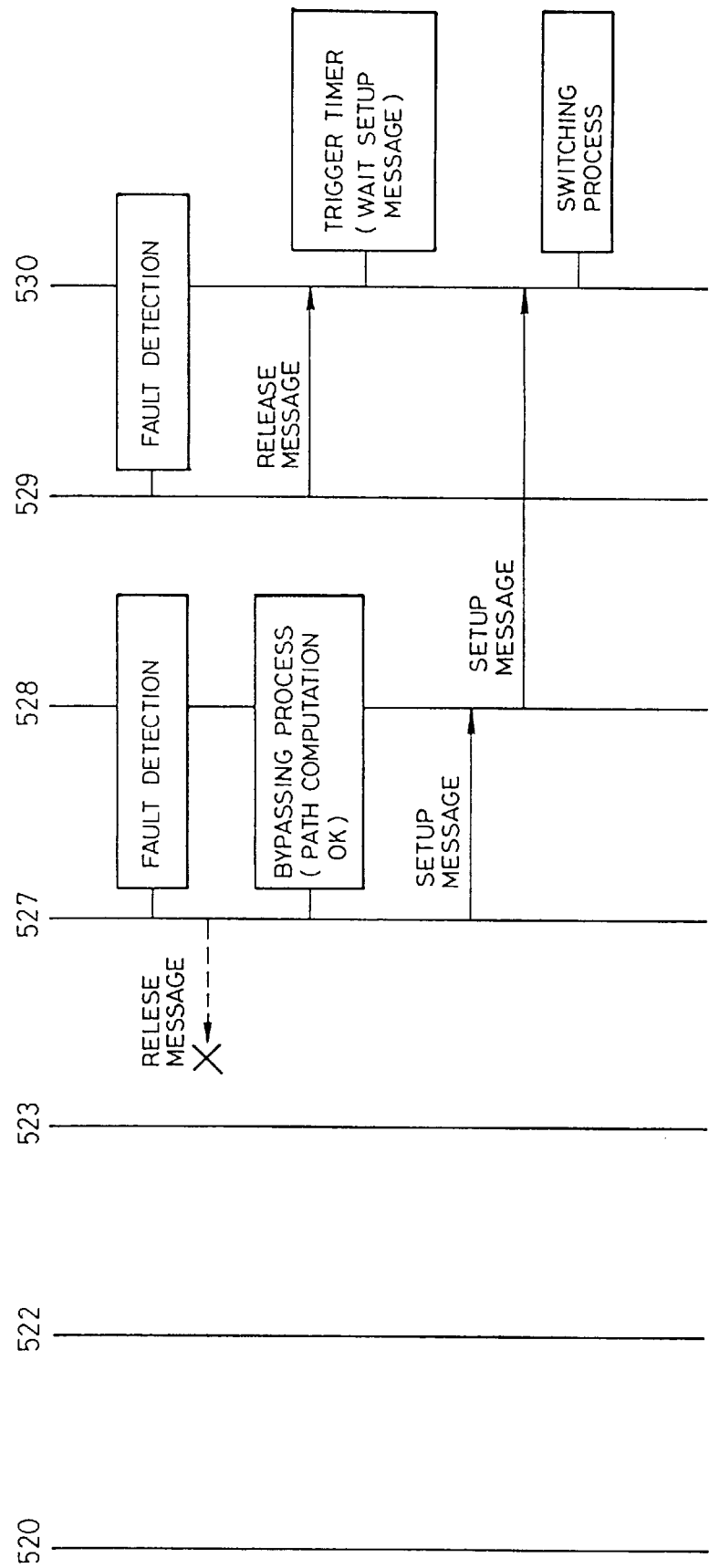
FIG. 11 shows one example of a message flow of the fault recovery system.

FIGS. 9 and 11 show example when failure is bypassed in the same PG when connection failure is caused in the first embodiment of the present invention. It should be noted that, in FIG. 9, only portion of the PG503 [A.3] is shown for the purpose of disclosure. When failure is caused in the link of the node 527 [A.3.1]~the node 529 [A.3.3], initially, occurrence of failure is recognized by the node 527 [A.3.1] and the node 529 [A.3.3]. It should be noted that, while the Release message due to occurrence of failure is not received in the node 527 [A.3.1], recognizing of failure is dealt as equivalent to the case where the Release message is received.

The bypass process judgment means 103 of the node 527 [A.3.1] is the PG entry border note and the node 527 [A.3.1] is located between the calling terminal demanding establishing of connection and the faulty portion, judgment is made that the own node should primarily perform bypassing process. In the path computing means 104 of the node 527 [A.3.1], the path is computed neglecting failure. Assuming that the result [A.3.1–A.3.2–A.3.4] is obtained, the signaling means 102 of the node 527 [A.3.1] transmits the Setup message for bypass path setting to the adjacent node 528 [A.3.2]. In the node 528 [A.3.2], when this message is received, setting of connection is performed to transmit to the adjacent node 530 [A.3.4].

On the other hand, the bypassing process judgment means 103 of the node 529 [A.3.3] makes judgment that the own node is the repeat node when bypassing process is not performed in the own node 529 [A.3.3], to transmit the Release message due to occurrence of failure to the node 530 [A.3.4] as the direction to the terminal not causing failure, on the connection path.

The node 530 [A.3.4] receives the Setup message and the Release message. The bypass process judgment means 103 of the node 530 [A.3.4] makes judgment that the own node is the outlet node of the PG and is located between the faulty portion and the destination terminal to subsidiarily perform the bypassing process. At this time, when the Release message is received at earlier timing, the timer 106 is triggered.

Then, when the Setup message is received before time out of the timer 106, the faulty connection is continued. Then the bypass path obtained by the Setup message is connected to the path in the direction to the terminal not causing failure of the faulty connection. If the Setup message does not arrive and the timer 106 becomes time out, judgment is made that faulty portion cannot be bypassed at this node. Then, the Release message is transmitted to the next node 531 [A.4.1] on the path.

On the other hand, when Setup message is received at earlier timing than the Release message, of course, faulty connection is still maintained. Thus, switching is performed to restore connection. At this time, the path in the direction of the faulty connection where failure is caused, is shut off by the releasing message which will be received. Then, the Release message is abandoned.

Here, in the node 530 [A.3.4], while the Setup message arrives, if the Release message does not reach in certain reason, remaining path cannot be eliminated. By using the fault recovery system, disconnection can be certainly performed by transmitting the Release message.

Next, discussion will be given for the case 2 of failure where failure is caused in the link between the node 530 [A.3.4]~the node 531 [A.4.1] in the ATM network shown in FIG. 5.

Figure 10:
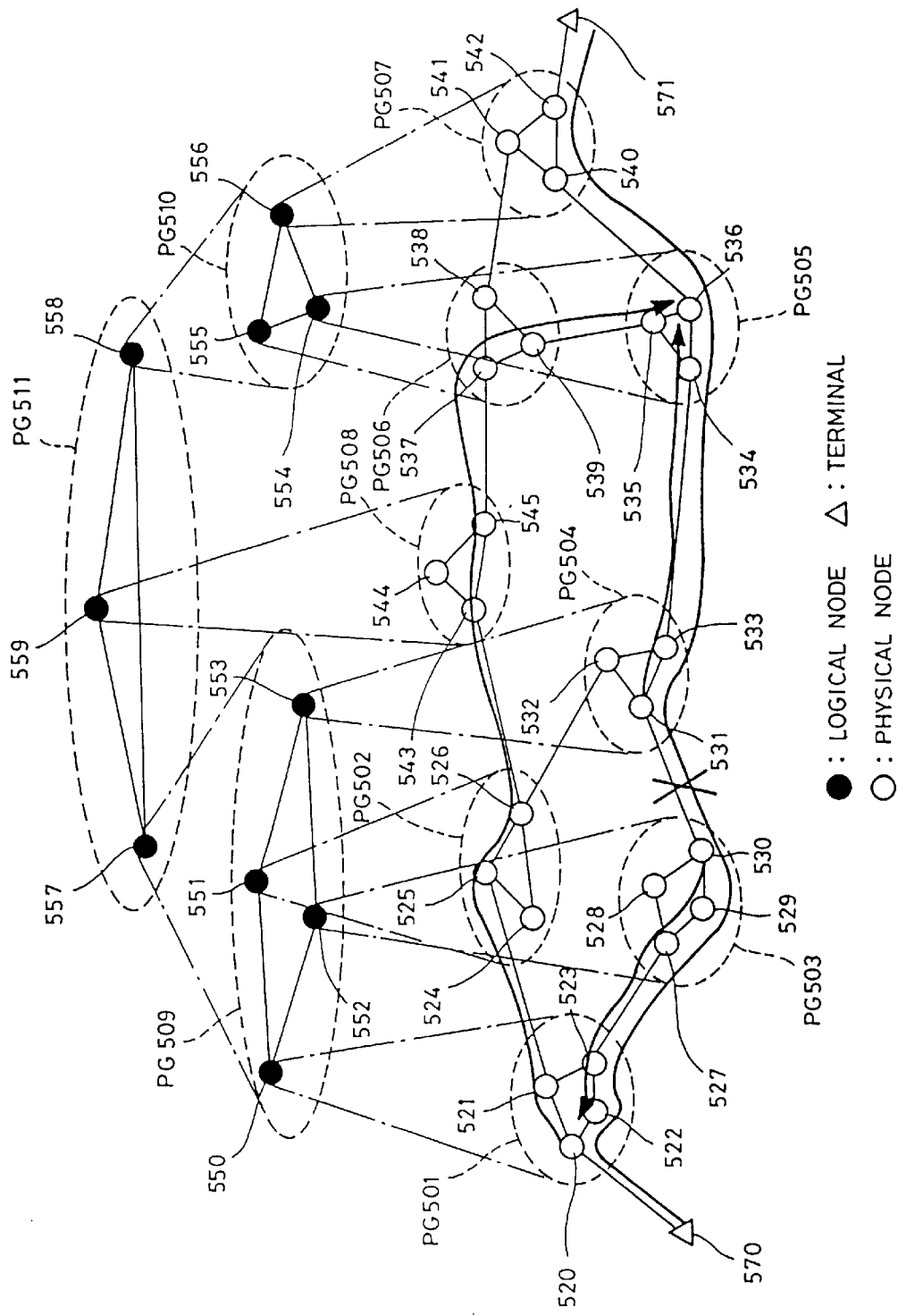
FIG. 10 is an illustration showing another example of failure in the network.
Figure 12:
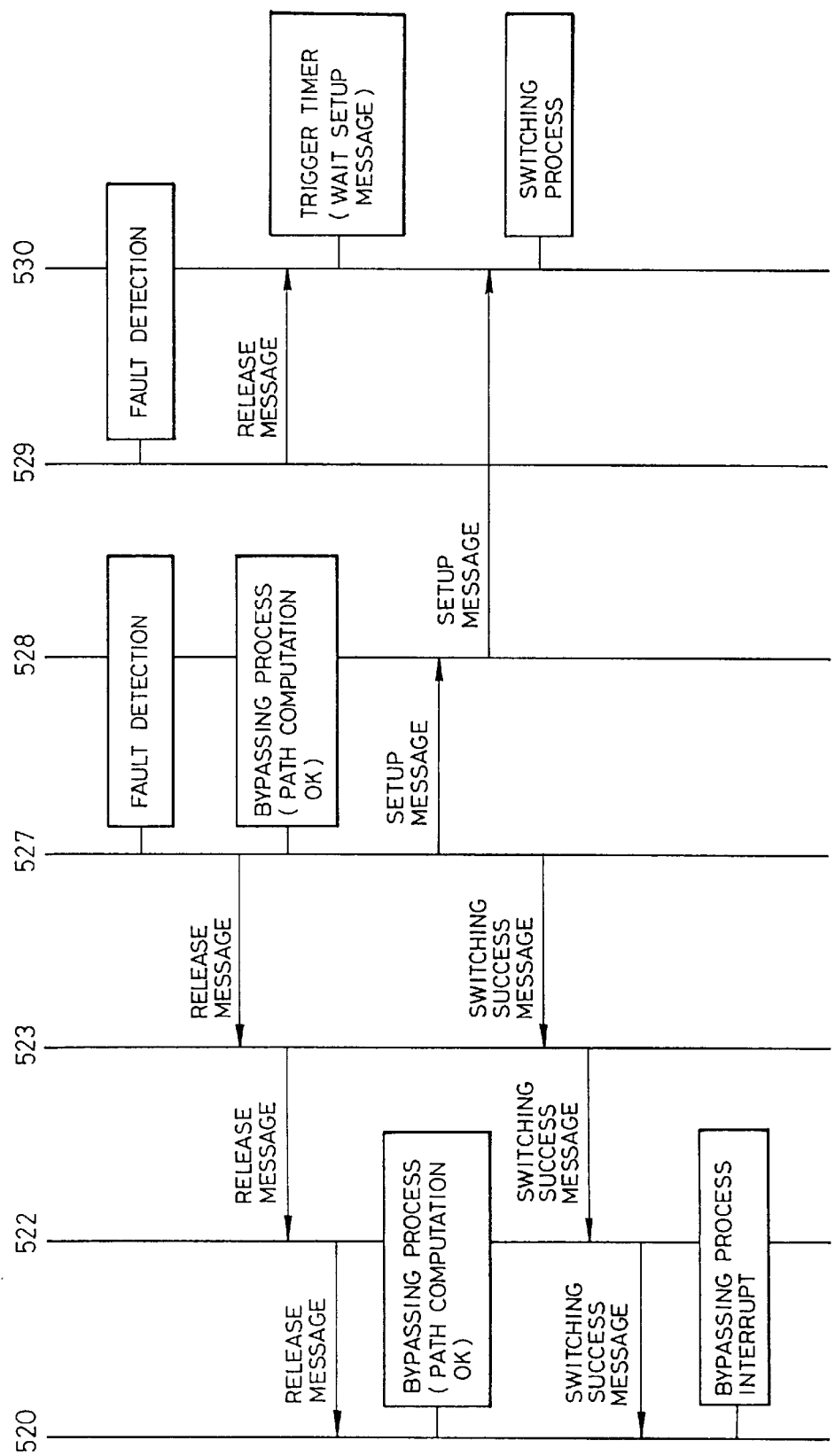
FIG. 12 shows another example of a message flow of the fault recovery system.

FIGS. 10 and 12 show an example upon bypassing in the PG of the upper hierarchical layer without bypassing failure in the PG upon occurrence of connection failure, in the first embodiment of the present invention. When failure is caused in the link between the node 530 [A.3.4]~the node 531 [A.4.1], initially, occurrence of failure is recognized by the node 530 [A.3.4] and the node 531 [A.4.1]. The bypass process judgment means 103 of the node 530 [A.3.4] makes judgment that the own node is the repeat node not performing bypassing process to transmit the Release message to the node 529 [A.3.3]. When judgment is made that the own node is the repeat node even in the bypassing process judgment means 103 in the node 529 [A.3.3], the Release message is further transmitted to the node 527 [A.3.1].

In the bypassing process judgment means 103 of the node 527 [A.3.1], judgment is made that the own node should primarily perform bypassing process. However, since the path computation to be performed in the node 527 [A.3.1] is only in the PG503 [A.3], the Release message is further noticed to the node 523 [A.1.4], the node 522 [A.1.3] and the node 520 [A.1.1].

The node 520 [A.1.1] corresponds to the entry node. Therefore, the bypassing process judgment means 103 performs path computation with judgment to primarily perform the bypassing process. By this, when the bypass path [A.1.1→A.1.2] [A.1→A.2] [A→C→B] is obtained, the Setup message for bypass path is transmitted on the basis of the obtained path.

On the other hand, the bypassing process judgment means 103 of the node 531 [A.4.1] makes judgment that the own node is the repeat node not performing bypassing process to transmit the Release message to the node 533 [A.4.3]. In the node 533 [A.4.3], upon reception of the Release message, judgment is made that the own node should subsidiarily perform the bypassing process. Then, the timer 106 is triggered. During this, in the node 533 [A.4.3], transmission of the Release message is deferred. As a result, since the Setup message does not pass the node 533 [A.4.3], the timer becomes time out. Then, the Release message is transmitted to the node 534 [B.1.1].

On the other hand, at the node 534 [B.1.1], judgment is made that the own node is the repeat node. The timer 106 is also triggered and the arrival of the Setup message is expected. Furthermore, the Release message is transmitted to the node 536 [B.1.3]. Then, upon arrival of the Setup message, by connecting the bypass path established by the Setup message and the remaining faulty connection, connection can be restored.

On the other hand, a difference between the fault recovery system in consideration of FIG. 2 and the fault recovery system in consideration of FIG. 3 will be discussed utilizing FIGS. 11 to 14, in terms of already discussed two faulty cases.

FIG. 11 shows the message flow in the case 1 of failure and the detail of the process in the node, in the fault recovery system of FIG. 1. The shown fault recovery system takes a system not to transmit the Release message until judgment that switching cannot be done, is made. In case of this failure, in the node 527 [A.3.1], since the bypass path is computed and switching is completed, the Release message is not transmitted for the direction of the node 523 [A.1.4].

FIG. 12 shows the detail of the message flow and the process in the node in the case 1 of failure in the fault recovery system of FIG. 3. The shown fault recovery system expands the Release message to add the content that the switching process is on going, to transmit the Release message once.

In this case of failure, the node 527 [A.3.1] transmits the Release message added the information that the switching process is on going, in a direction of the node 523 [A.1.4]. Then, the Release message finally reaches the node 520 [A.1.1] as the entry node. The node receiving this message respectively compute bypass path. In the node 527 [A.3.1], switching of the bypass path is completed, a result message indicating that switching of the bypass path is completed, is noticed to the node 523 [A.1.4] to notice to the other primary fault recovery system that bypass process is not performed.

Figure 13:
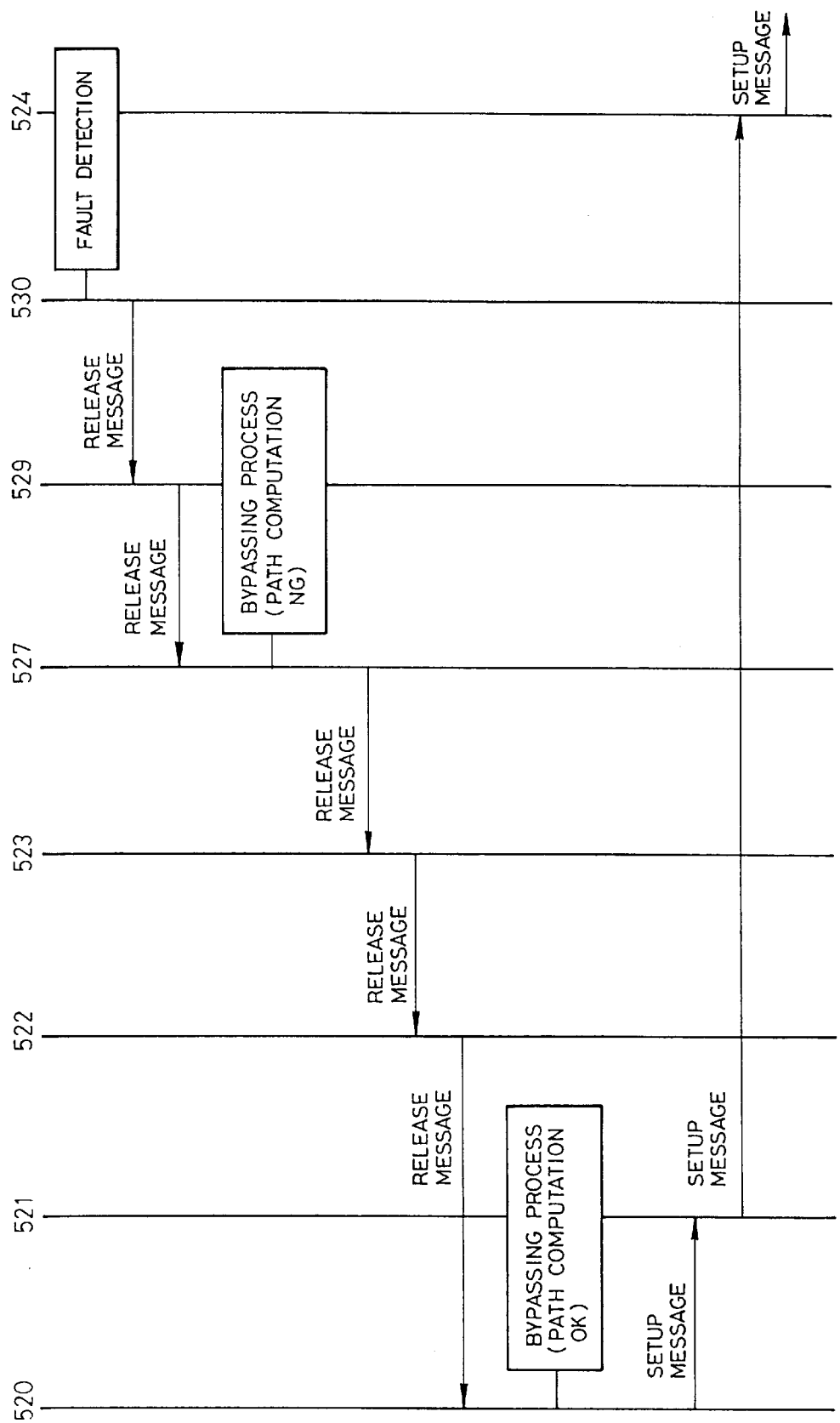
FIG. 13 shows a further example of a message flow of the fault recovery system.

FIG. 13 shows the detail of the message flow and the process in the node for the case 2 of failure in the fault recovery system of FIG. 2. In case of this failure, in the node 527 [A.3.1], the bypass path cannot be computed. Therefore, toward the node 523 [A.1.4], the Release message is transmitted. Finally, bypass path computation is performed in the node 520 [A.1.1] to perform bypassing process. Namely, Setup message for bypass path setting is transmitted. When the bypass path is established, switching process is performed.

Figure 14:
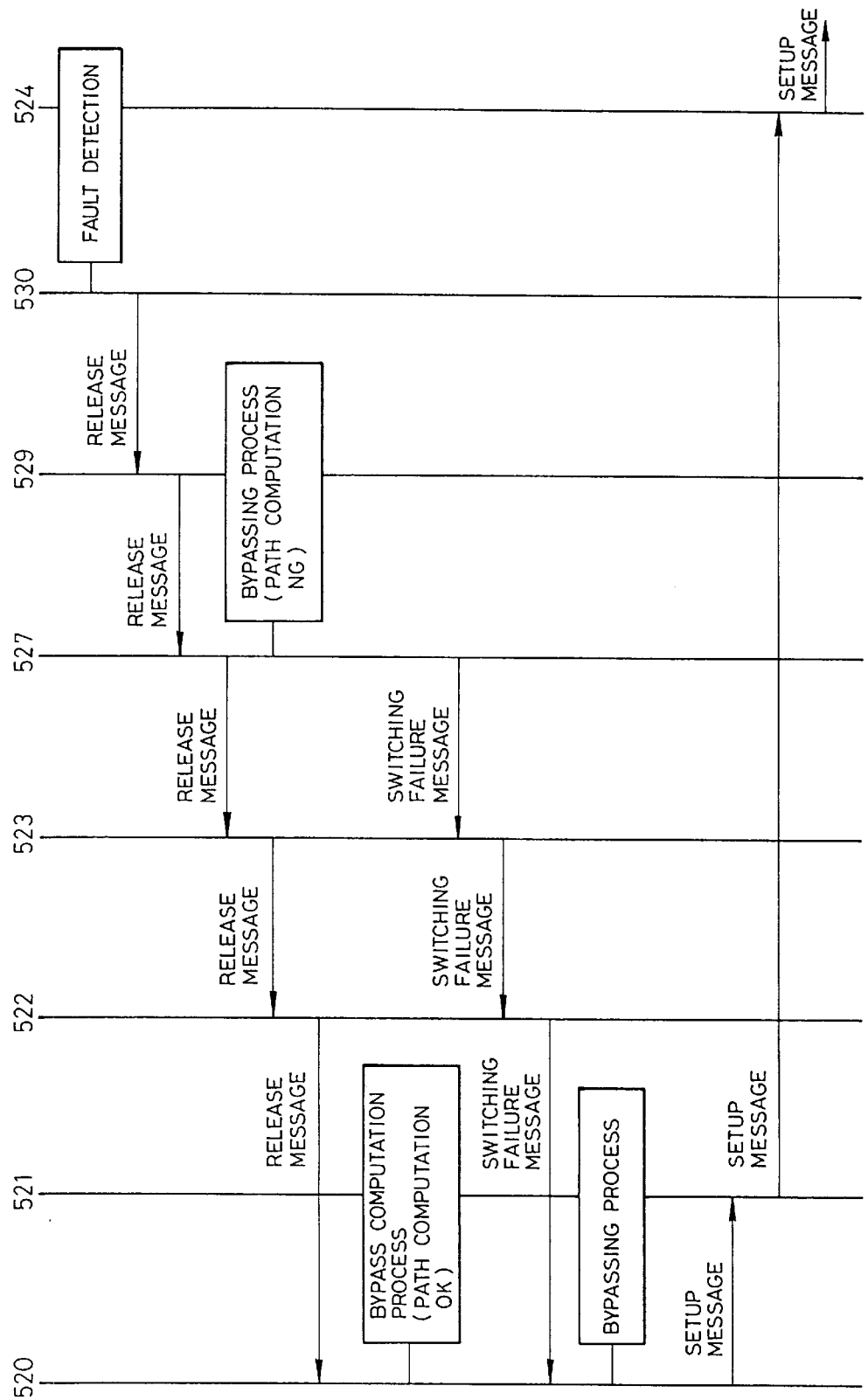
FIG. 14 shows a still further example of a message flow of the fault recovery system.

FIG. 14 shows the detail of the message flow and the process in the node in the case 2 of failure in the fault recovery system of FIG. 3. In case of this fault recovery system. in the node 527 [A.3.1], the Release message added the information that switching process is on going, is transmitted. Then, the node 520 [A.1.1] receives the Release message. Since the content of the Release message is that the switching process is on going, only bypass path computation is performed. Then, in this example, the node 527 [A.3.1] transmits the message indicative that switching cannot be done. Therefore, the node 520 [A.1.1] executes the bypassing process on the basis of the bypass path preliminarily calculated, upon reception of this message.

Finally, discussion will be given for operation in the case where the fault recovery system of FIG. 8 is used. At first, the process to establish connection with the destination terminal having Any Cast address, for which the system shown in FIG. 8 is effective, will be briefly discussed with reference to FIGS. 15 and 16. The destination terminal having the Any Cast address means the terminal performing a particular service. Even when the ATM address of the destination terminal is not known to the calling party, the connection can be established by designating the address indicative of the service. It is typical that a plurality of the terminals having the Any Cast address are present in the network. Therefore, whenever the connection for receiving the service is set, the terminal having Any Cast address to be connected can be changed.

Figure 15:
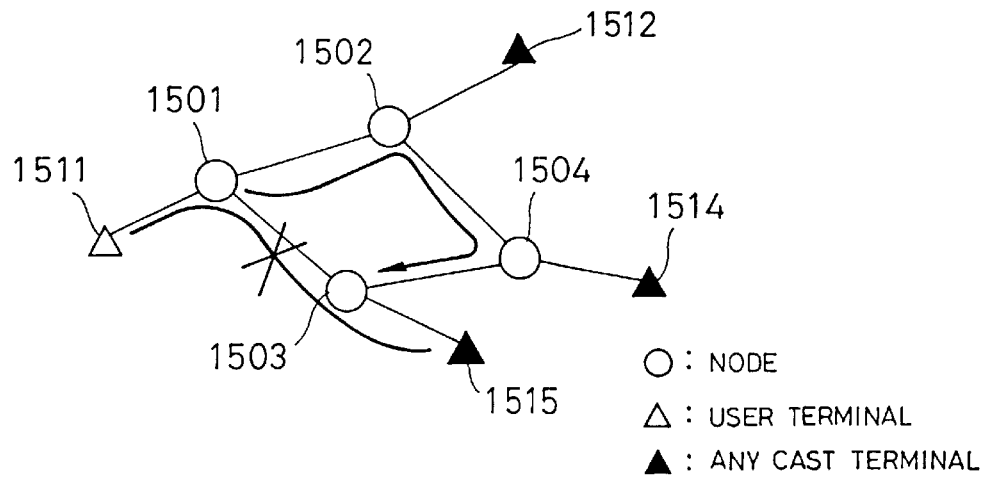
FIG. 15 shows an example of a network of the fault recovery system.
Figure 16:
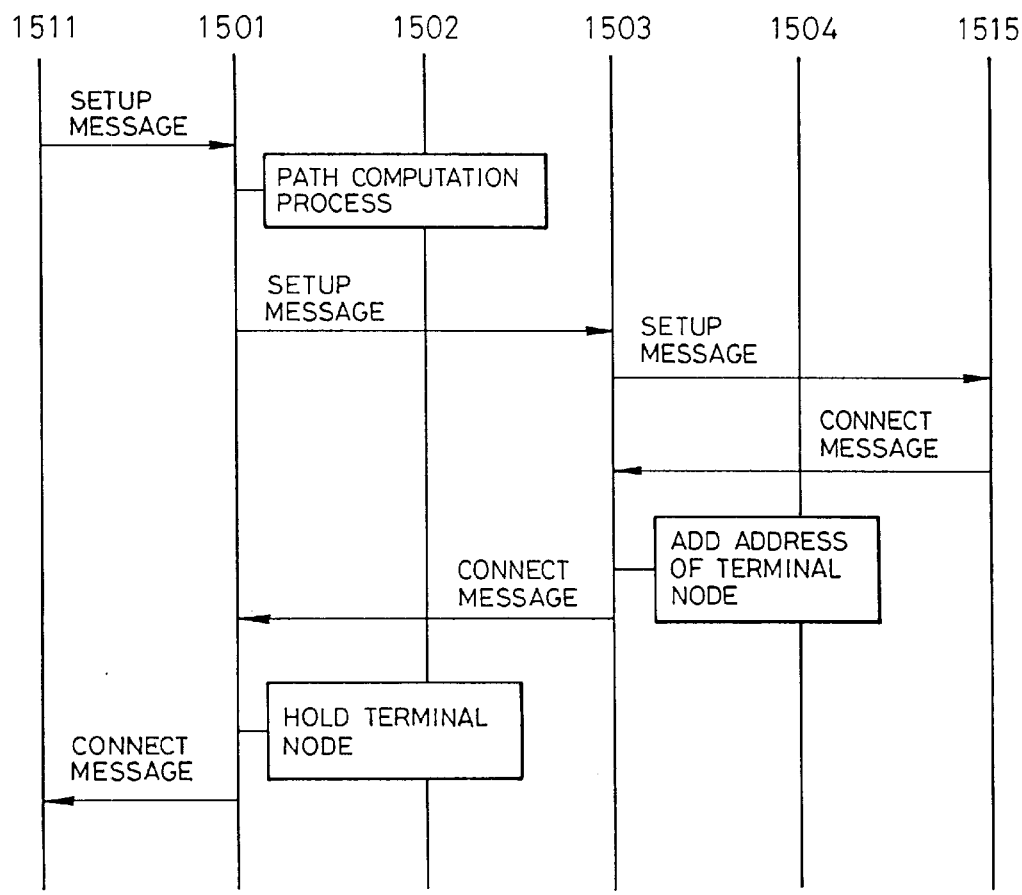
FIG. 16 is an example of a message flow of the fault recovery system of FIG. 15.

In FIG. 15, when the calling terminal 1511 transmits the Setup message for establishing connection to the terminals having the Any Cast address, the entry node 1501 selects any one of a plurality of terminals having the Any Cast addresses for the same service, to compute a path to the address of the node 1504 connected to the selected one of the terminal having the Any Cast address for the designated service. Then, by transmitting the Setup message, connection can be established with the selected one of the terminal 1514 having the Any Cast address for the designated service.

In the fault recovery system shown in FIG. 8, upon setting connection, a method to store an address of the exit border node in each fault recovery system, is taken. A particular method for obtaining the address of the exit border node is that, for example, since a connect message is issued in response to the Setup message upon establishing of connection, the address of the exit border node may be added to the connect message. Then, upon occurrence of failure in the path, bypassing process for connection is taken place on the basis of the stored terminal address.

In FIG. 15, there is illustrated a manner of connection to the exit border node 1303 since the ATM address of the exit border node 1303 is known, upon occurrence of failure while connection is established between a terminal 1511 and an Any Cat terminal 1313.

As set forth above, the fault recovery system according to the present invention achieves the following effects. The first effect is that the fault recovery system according to the present invention can be adapted to large scale hierarchical network. The reason is that upon exchanging dynamic routing information in the large scale network, hierarchy is established in the network to logically divide the network to locate respective node therein, which enables each node to make own judgment upon occurrence of failure to facilitate management.

The second effect is that bypassing of the faulty portion is possible as long as paths are present. The reason is that since a plurality of fault recovery systems, each of which computes the bypassing path, are present on the connection, even if recovery cannot be accomplished by one fault recovery system, recovery may be accomplished by other fault recovery system.

The third effect is that switching of the path can be done with small delay. The reason is that when the bypass path and the path, on which failure is caused, overlap, it becomes possible to establish connection only for the overlapping portion in the auxiliary fault recovery system in the present invention. Therefore, establishing of connection for the remaining portion becomes unnecessary.

The fourth effect is that a service received before occurrence of failure of connection can be continued. The reason is that the address of the node to which the destination terminal providing the service is stored upon establishing connection, and bypassing process can be performed on the basis of the stored address of the node.

Figure 18:
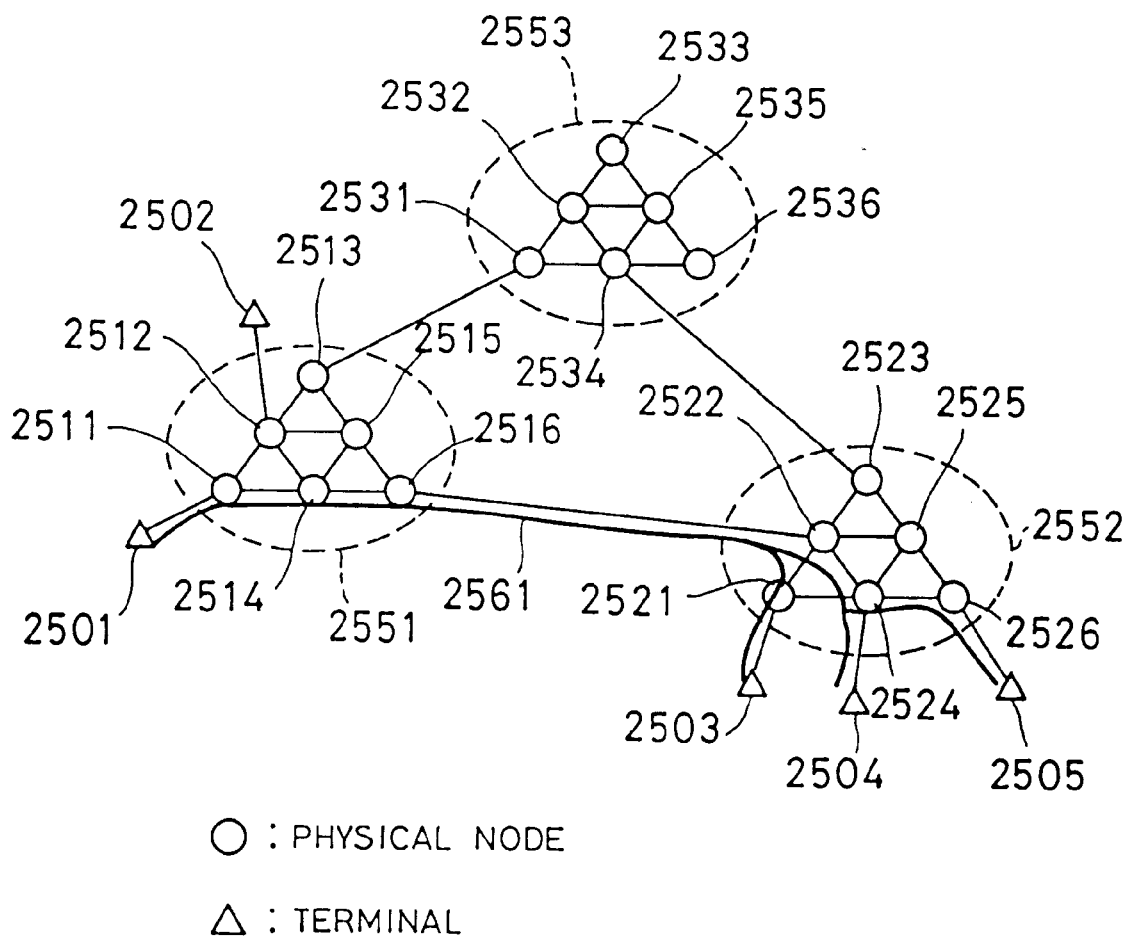
FIG. 18 shows an example of a network to which a further embodiment of the fault recovery system of FIG. 17 is applicable.
Figure 19:
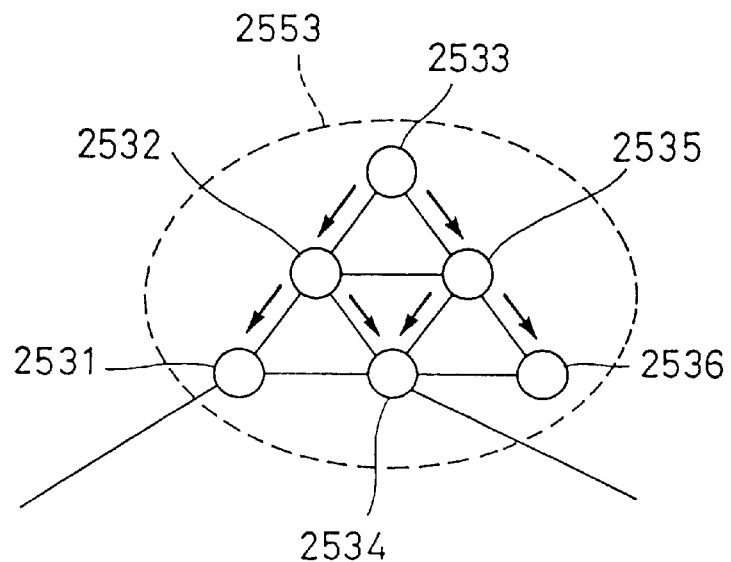
FIG. 19 is an illustration showing an operation of flooding of topology information.

Next, another embodiment of the fault recovery system according to the present invention will be discussed with reference to the drawings. FIG. 18 shows a network on the basis of the PNNI protocol.

Next, discussion will be given for a multi-point connection. In normal communication, the calling terminal and the destination terminal are connected in one-by-on basis (point-to-point connection). In contrast to this, the multi-point connection is a connection technology for simultaneously transmitting from the calling terminal to a plurality of the destination terminals. In the technology of multi-point connection, there have been proposed several methods. Amongst, basic method is that the calling terminal performs setting process for all of the destination terminals adapted to multi-point connection.

In particular, upon establishing connection with the destination terminal, to which connection is established at first, the Setup message is transmitted. Upon establishing connection with the destination terminals, to which next and subsequent connection is to be established, Add Party message is transmitted. At the node where the path branches, the Add Party message is transmitted as the Setup message to establish connection.

For example, when connection is initially established with respect to the destination terminal 2504 (see FIG. 18), the calling terminal 2501 transmits the Setup message to the entry node 2511. Then, in the entry node 2511 of connection, path computation in the destination terminal 2504 is performed to transmit the Setup message to the node 2514 as the next node. Then, for each node receiving the message, the Setup message is transmitted sequentially to establish connection by transmitting the Setup message to the destination terminal 2504, finally.

When connection is established for the destination terminal as multi-point connection after completion of connection up to the destination terminal 2504, the Add Party message is transmitted from the calling terminal 2501 to the entry node 2511. In the entry node 2511, the path up to be destination terminal 2503 is computed. At this time, since the path is the same direction as the precedingly connected destination terminal 2504, the Add Party message is transmitted.

Since the Add Party message is noticed to the node where the path is branched, the Add Party message is transferred to the nodes 2511, 2514, 2516 and 2522. The Add Party message becomes the Setup message from the node 2522 to the node 2521, and finally transmitted to the destination terminal 2503 for establishing connection.

However, in such setting method, processing load and management information in the calling terminal become greater at greater number of destination terminals. As a solution for this, a system called as Network LIJ (Leaf Initiated Join) is proposed. This method can also be set when establishment of multi-point connection is requested. Also, instead of making the calling terminal to control establishment of connection, multi-point connection is managed and established within the network. Particularly, the present invention is characterized when Network LIJ is utilized.

The Network LIJ system initially establishes connection between the network and the calling terminal only once. When the destination terminal transmits Leaf Setup Request message as demand for multi-point connection, the node (exit border node) connected to the destination terminal receiving the demand, performs path computation up to the calling terminal to transmit the Leaf Setup Request message according to the path.

Then, a representative multi-point process node performing connection process in the network for the calling terminal is arranged. By transmitting the Setup message or the Add Party message from the representative multi-point process node to the destination terminal, multi-point connection process is performed.

For example, in the condition where the destination terminals 2504 and 2503 are already connected, when establishment of connection is demanded from the destination terminal 2505, the Leaf Setup Request message is transmitted. In the exit border node 2526, the path up to the node 2501 as the calling terminal is computed to transmit the Leaf Setup Request through the path.

In case of the representative multi-point process by the node 2522, when the Leaf Setup Request message arrives to the node 2522, the node 2522 performs management of connection up to the destination terminal 2505 to perform connection establishing process for the destination terminal 2505 from the node 2522.

Since connection is established between the node 2522 and the node 2524, the Add Party message is transmitted. Since branching is performed at the node 2524, the Setup message is transmitted to the node 2526 to establish connection up to the destination terminal 2505.

Thus, in the direction toward the calling terminal 2501 from the representative multi-point process node 2522, the message concerning establishment of connection is not transmitted. Namely, since the calling terminal 2501 is not required to manage the destination terminal 2505, the process load in the calling terminal 2501 can be reduced.

The shown embodiment of the present invention employing the technology as set froth above is applied for the network utilizing the multi-point connection technology.

Figure 17:
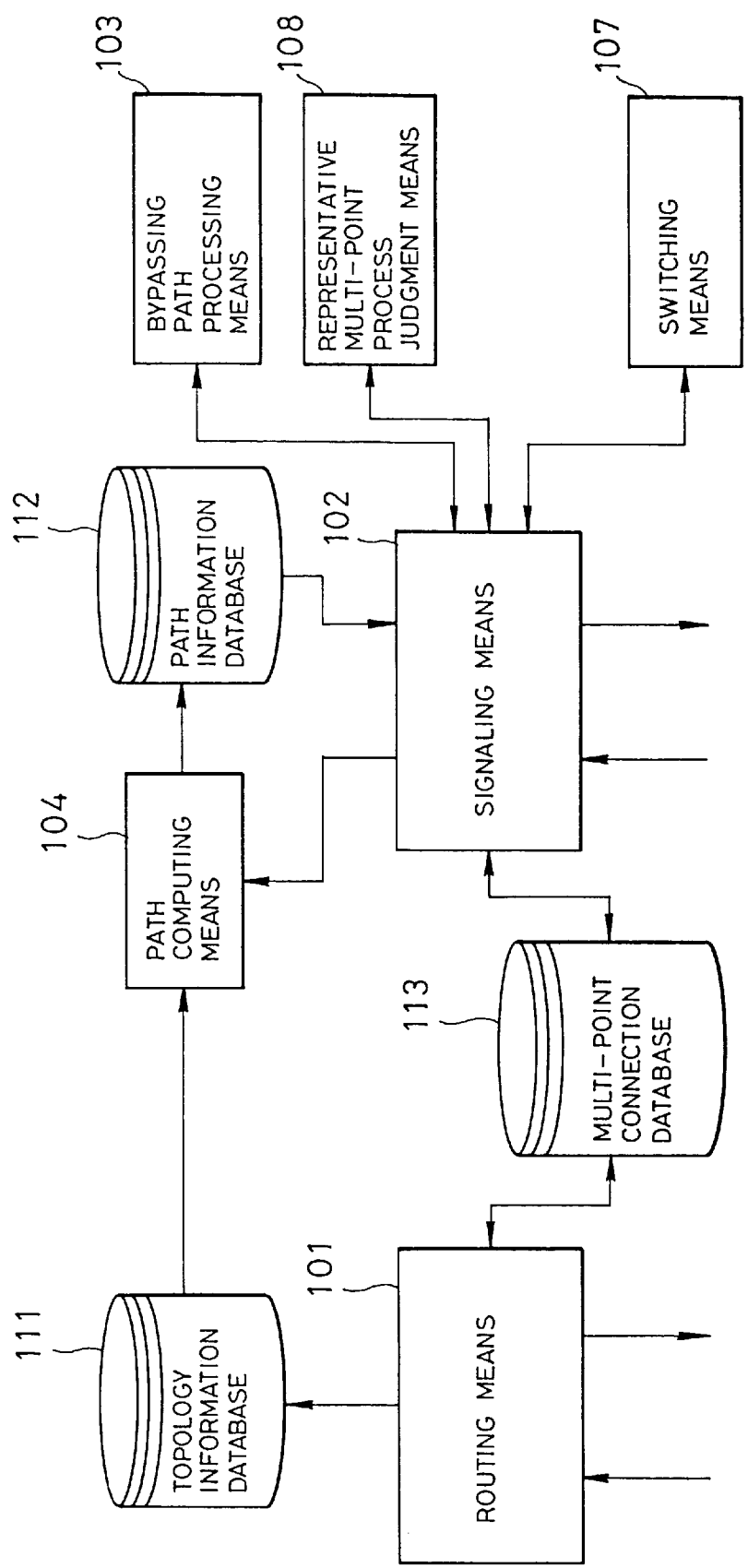
FIG. 17 is a block diagram of a further embodiment of the fault recovery system according to the present invention.

FIG. 17 is a functional block diagram showing the preferred embodiment of the present invention. The major components of the shown embodiment of the network are the routing means 101, the signaling means 102, the bypassing process judgment means 103, the path computing means 104, a representative multi-point process judgment means 105, the switching means 107, the topology information database 111, the path information database 112 and a multi-point connection database 113.

The routing means 101 has a protocol of the same specification as the PNNI routing protocol defined by the ATM forum set forth above. The routing means 101 normally exchanges topology information by exchanging the routing message between the own node and adjacent nodes.

If the exchanged topology information is different from the content of the topology information database 111 of the own node and judgment is made that updating is required by the provision, the content of the topology information database 111 is updated. Then, is flooding is required, flooding is performed. On the other hand, when the own node is the representative multi-point process node, for the candidate node to be other representative multi-point process node, flooding is similarly performed for the content of the multi-point connection database.

The signaling means 102 generally performs the following two processes. The first process is the process for establishing and disconnecting the connection in response to a demand from the terminal. The second process is the process for disconnecting and re-establishing of connection upon occurrence of failure within the network. Since process functions are differentiated depending upon positions of the nodes in the connection path, the representative multi-point process will be discussed separately for the entry node, the exit border node and other nodes (repeat nodes).

At first, discussion will be given for process of establishing or disconnecting of multi-point connection from the destination terminal, as the first process of the signaling means 102.

In the exit border node, upon reception of the Leaf Setup Request message indicative of demand when multi-point connection from the destination terminal is established, if judgment is made that the own node is not the representative multi-point process node, the signaling means 102 notices that path computation up to the calling terminal is necessary, to the path computing means 104. The path computing means 104 transmit the Leaf Setup Request message to the adjacent node as next transmitting destination. If the own node is the representative multi-point process node, branching connection process of the connection is performed. In conjunction therewith, the Setup message is transmitted to the destination terminal for establishing connection.

In the repeat node, upon reception of the Leaf Setup Request message, if judgment is made that the own node is not the representative multi-point process node, the Leaf Setup Request message is transmitted to the calling terminal. If the own node is the representative multi-point process node, the information of the destination terminal is set in the multi-point connection database 113 to notice that path computation is necessary to the path computing means 104 to obtain path information. If the path is the same direction as the existing connection, the Add Party message is transmitted. On the other hand, when the path is in different direction to the existing connection, the Setup message is transmitted.

Upon entry node being the representative multi-point process node and the Leaf Setup Request message is received, the path computation up to the destination terminal is performed. If the path is the same direction as the existing connection, the Add Party message is transmitted. On the other hand, when the path is in different direction to the existing connection, the Setup message is transmitted to the destination terminal.

On the other hand, in all nodes, upon reception of the Setup message in the direction from the calling terminal, connection establishing process is performed in the own node. For the node to be the next or the designation terminal on the basis of the path information in the Setup message, the Setup message is transmitted. On the other hand, when the Add Party message is received, on the basis of the path information in the message, the message is transmitted to the node to be the next. On the other hand, when the path is different from the existing connection, branching process is performed to transmit the Setup message on the basis of the path information.

Furthermore, in case of the representative multi-point process node and when the Setup message or the Add Party message is received, the destination terminal information is set in the multi-point connection database 113. It should be noted that, in the representative multi-point process node in the start point node, only one destination terminal of the multi-point connection via other representative multi-point process node is to be managed.

In this case, the management information of the destination terminal is the content of the Setup message transmitted for establishing connection from the calling terminal. The management information of the destination terminal address, the calling terminal address, a demanded quality information of connection, a protocol to be used are stored in the database 113.

Next, discussion will be given for the process when the Release message or Drop Party message concerning disconnection of path in response to the demand from the destination terminal. In all of the nodes, judgment is made whether branching process is performed in the own node. If branching process is not performed, the Release message is transmitted in the direction toward the calling terminal as is to shut off connection in the own node. On the other hand, when branching process is performed in the own node, the Drop Party message is transmitted in the direction toward the calling terminal to disconnect connection only on the side of the destination terminal.

On the other hand, when the own node is the representative multi-point process node, the corresponding destination terminal information is deleted from the multi-point connection database 113.

Next, discussion will be given for the process for disconnecting and re-establishing of connection in response to occurrence of failure in the network, as the second process by signaling means 102.

At first, the node detecting failure in the network notices the Release message or the Drop Party message in the direction not causing failure in the path respect to the connection of the path to be influenced. It should be noted that these messages are partly different from the Release message or the Drop Party message in the content and includes information of the faulty portion.

Upon reception of the message, when each node is the representative multi-point process node and the node for performing the bypassing process, each node requests computation of the bypass path up to the exit border node except for the portion where failure is caused to the path computing means 104. Then, on the basis of the obtained path information, the Setup message or the Add Party message is transmitted to establish the bypassing path.

In case of the exit border node, reception of the Setup message or the Add Party message for setting bypass path by the node on the side of the calling terminal is waited. When the message is received, switching is performed. On the other hand, when the node is the representative multi-point process node and not the node for performing the bypassing process, the node performs a process as a repeat node. Namely, the Release message is transmitted to the next node on the path to perform disconnection of connection in the own node.

On the other hand, upon transmission of message, a multi-point identifier unique in the network is added.

Figure 22:
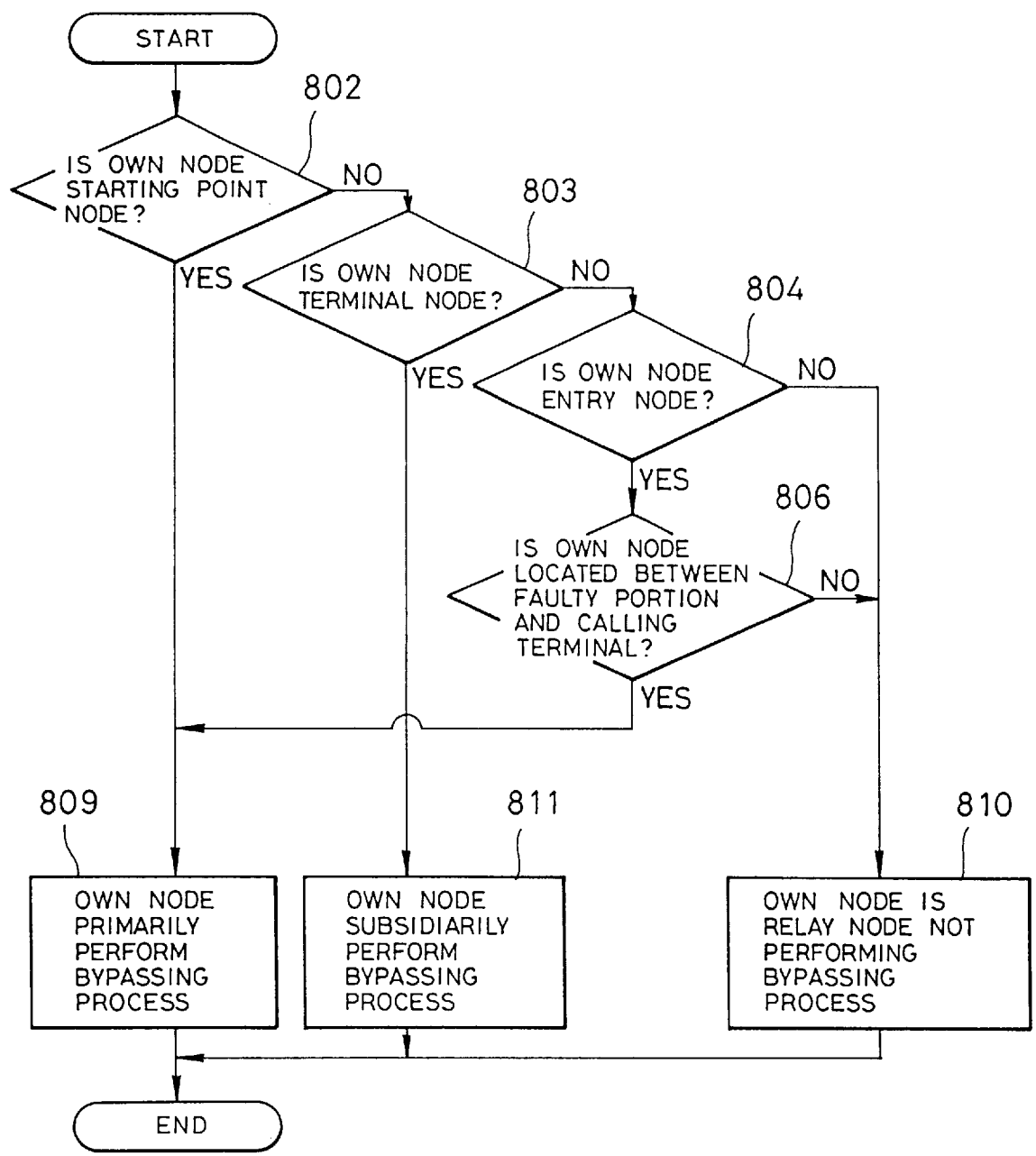
FIG. 22 is a flowchart showing an operation of a bypass process judgment means 103 of FIG. 17.

The bypassing process judgment means 103 performs judgment process according to a flowchart shown in FIG. 22. By recognizing the position of the own node on the path of the connection, judgment is made whether bypassing process is to be performed or not. In case of the entry node, the own node is taken as the node to primarily perform bypassing process (802, 809), in case of the exit border node, the own node is taken as the node to subsidiarily perform bypassing process (803, 811). On the other hand, in case of the representative multi-point process node, the own node is taken as a candidate node to primarily perform bypassing process.

Then, how the candidate nodes determine the node to perform bypassing process is, since the portion in the network where failure is caused, can be recognized from the content of the Release message or the Drop Party message due to occurrence of failure, for example, can be determined based on the information of the faulty portion and by recognizing the direction toward the calling terminal in the connection. Namely, when the own node is located between the faulty portion and the calling terminal, the bypassing process is to be performed primarily by the own node (804, 806, 809). If the own node does not correspond to these, the own node is taken as repeat node not contributing for switching (804, 810).

The path computing means 104 performs path computation based on the address of the destination terminal and the topology information database 111. As an example of method of path computation, use of known Dijkstra algorithm for computing the shortest path can be considered. Then, the result is set in the path information database 112. On the other hand, the path computation upon occurrence of failure performs path computation excluding the faulty portion.

Figure 23:
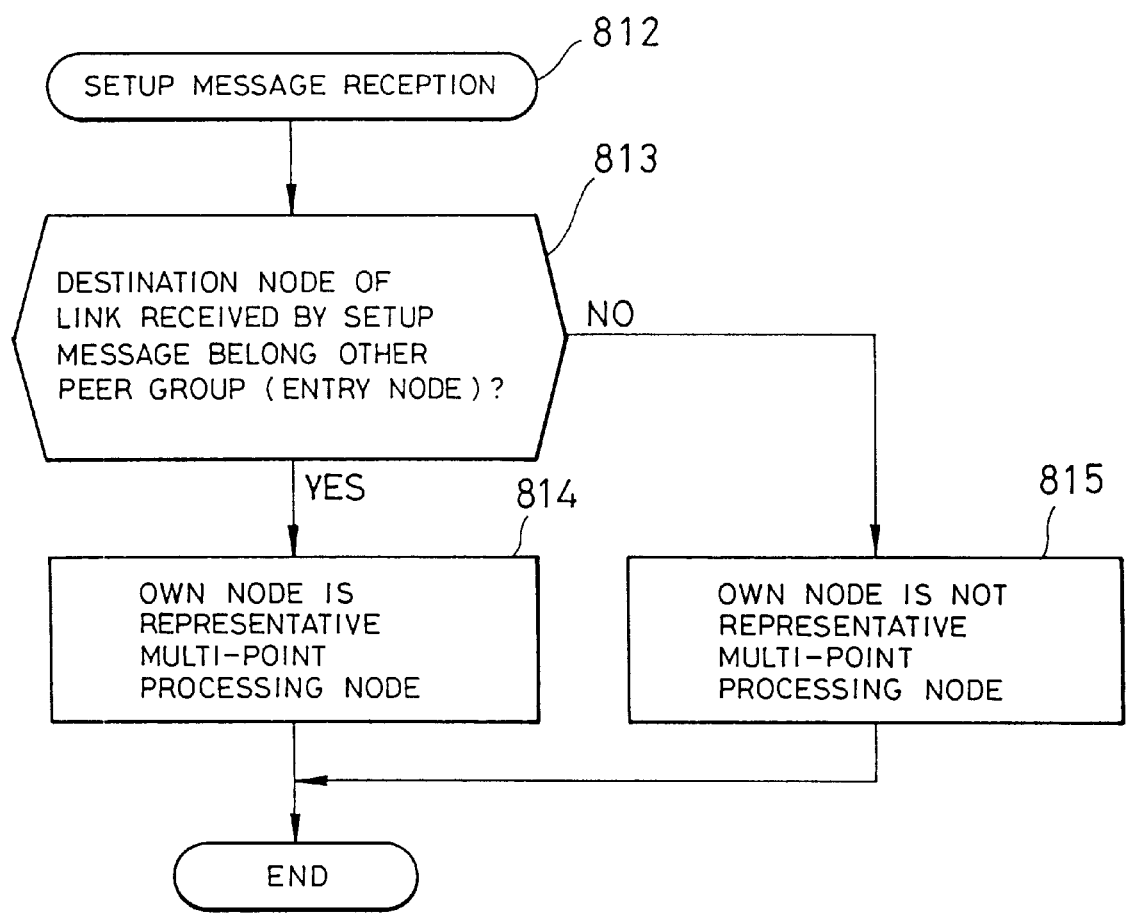
FIG. 23 is a flowchart showing an operation of a representative multi point process judgement means 108 of FIG. 17.

The representative multi-point process judgment means 105 performs judgment process according to a flowchart shown in FIG. 23. For example, in the Peer Group used in the PNNI of point-to-multi-point connection, when the own node is the closest node (entry node) (812, 813), there is a method to make judgment that own node is the representative multi-point process node (814, 815). In this case, the multi-point connection in the same Peer Group is performed by this node for management. Accordingly, in the entry node, the own node always becomes the representative multi-point process node.

The switching means 107 establishes connection in the direction not causing failure, with the path established by the Setup message or the Add Party message for bypass path setting. It should be noted that judgment which path and which path are to be connected, is made utilizing the multi-point identifier in the message.

Figure 24:
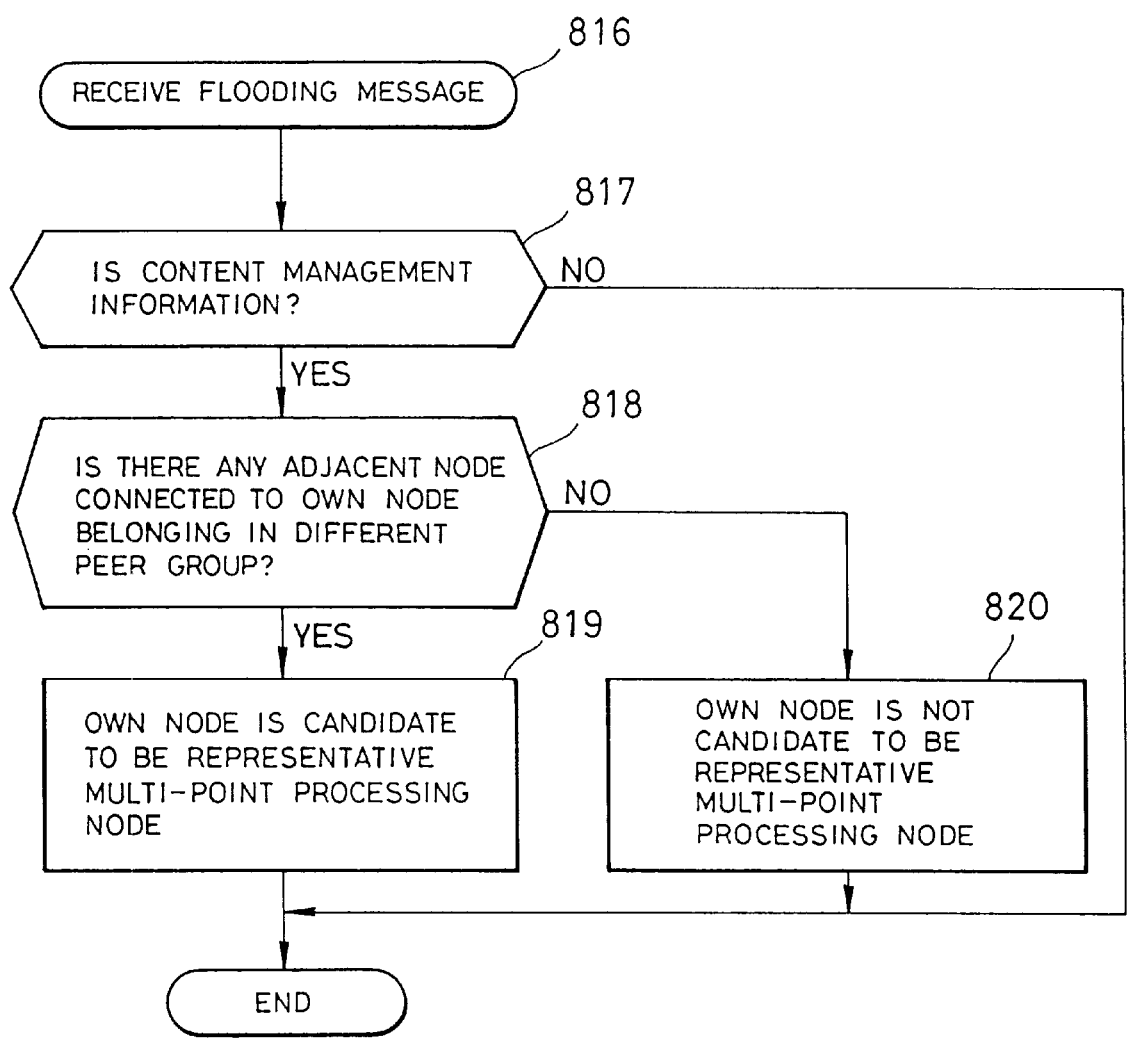
FIG. 24 is a flowchart showing a process of judgement whether own node can be a candidate to be representative multi point process node.

The representative multi-point process node performs flooding of the management information in the database 113 to the candidate node of other representative multi-point process node. In this case, the representative multi-point process node performs flooding of the management information by the routing means 101 irrespective that which is the corresponding candidate node. Each node receiving the management information makes judgment whether the own node is the candidate node according to a flowchart shown in FIG. 24. IN case of the candidate node, the management information is held in respective database.

Namely, when the management information is received (816, 817), judgment is made whether the node belonging in different Peer Group is present in the adjacent nodes connected to the own node (818). If the connected adjacent node which belongs in the different Peer Group, the own node is judged as a candidate of the representative multi-point processing node (819). Otherwise, judgment is made that own node is not the candidate to be the representative multi-point processing node.

Next, discussion will be given for particular examples of the overall process in the foregoing embodiment of the fault recovery system according to the present invention with reference to FIGS. 20, 21, 25, 26.

Figure 20:
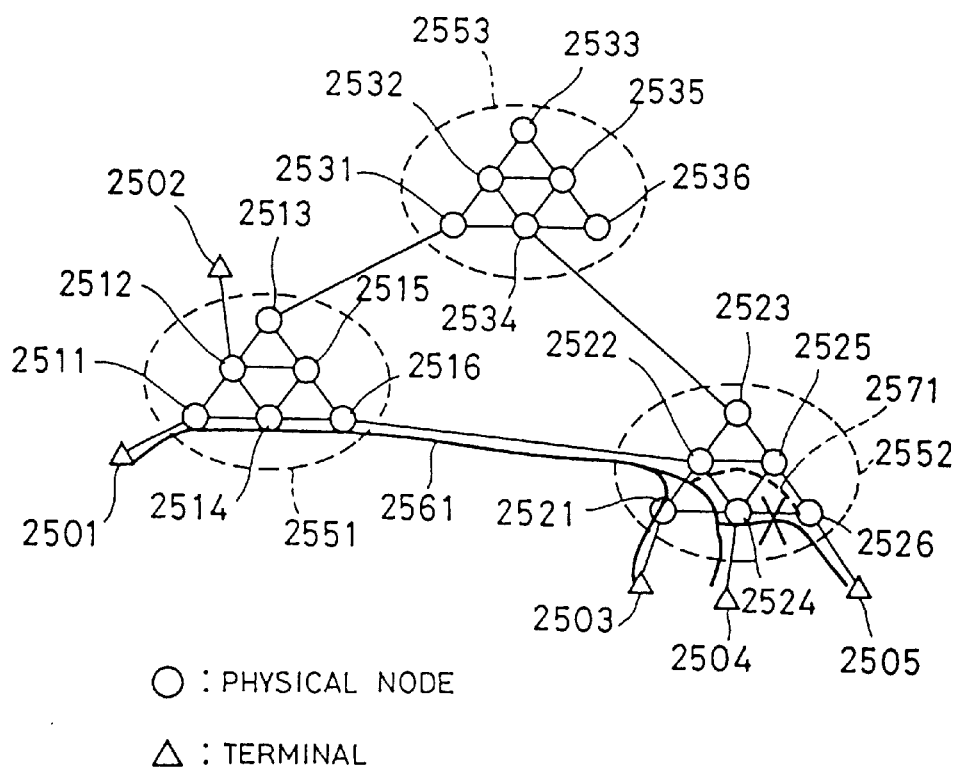
FIG. 20 is an illustration showing one example of recovery upon occurrence of failure in the network.
Figure 25:
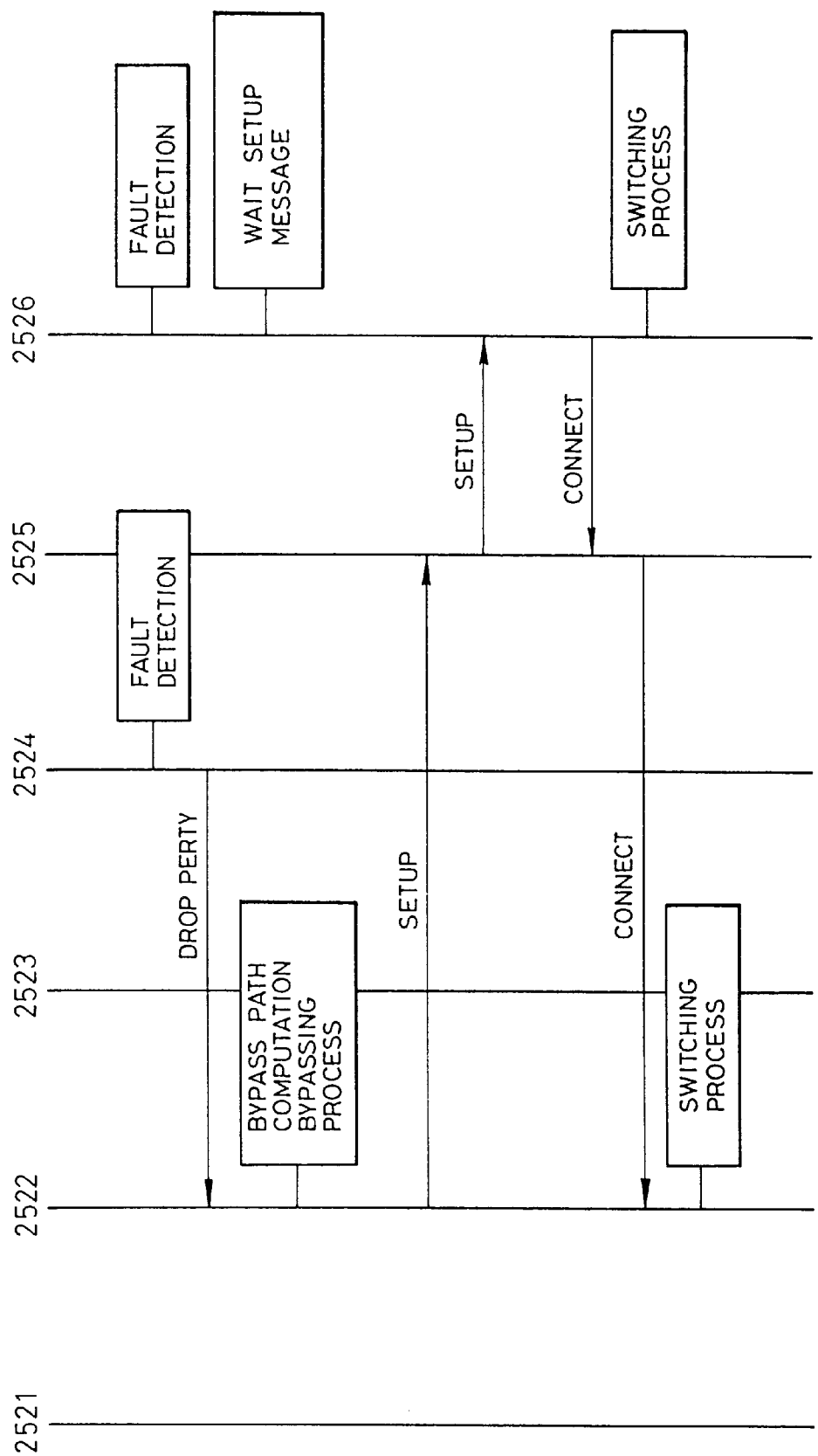
FIG. 25 is an illustration showing one example of a message flow of a switching process upon occurrence of failure.

FIG. 20 and 25 show an example of the case where the failure is bypassed by the representative multi-point processing node by utilizing the shown embodiment of the fault recovery system according to the present invention, upon occurrence of failure in the multi-point connection.

When failure is caused in a link between a node 2524 and a node 2526, at first, the nodes 2524 and 2526 should recognize occurrence of failure. In the shown example, the node 2526 is the exit border node. Therefore, the node 2526 waits for the Setup message having the same multi-point identifier with maintaining connection with the destination terminal 2505.

The bypassing process judgment means 103 of the node 2524 makes judgment that the own node is the repeat node since the own node is not the starting node or the entry node. Thus, the node 2524 transmits a message indicative of disconnection in the direction toward the calling terminal, namely to the node 2522. In this case, since other connection from the node 2524 is set, the Drop Party message is transmitted.

Then, in the shown embodiment, the node 2522 is the entry node. Therefore, the node 2522 becomes the representative multi-point processing node. Also, since the node 2522 is located between the calling terminal demanding establishment of connection and the faulty portion, judgment is made that the node 2522 primarily performs bypassing process. Then, in the node 2522, computation of the bypass path excluding the faulty portion is performed with respect to the exit border node 2526 connected to the destination terminal 2505. Assuming that the result [2522-2525-2526] is obtained, the signaling means 102 of the node 2522 transmits the Setup message for setting the bypass path added the multi-point identifier, to the adjacent node 2525.

In the node 2525, when the Setup message is received, the connection is established and the Setup message is then transmitted to adjacent node 2526. The exit border node 2526 is then responsive to the Setup message containing the same multi-point identifier to perform switching for establishing connection with the connection on the side of the destination terminal 2505.

Figure 21:
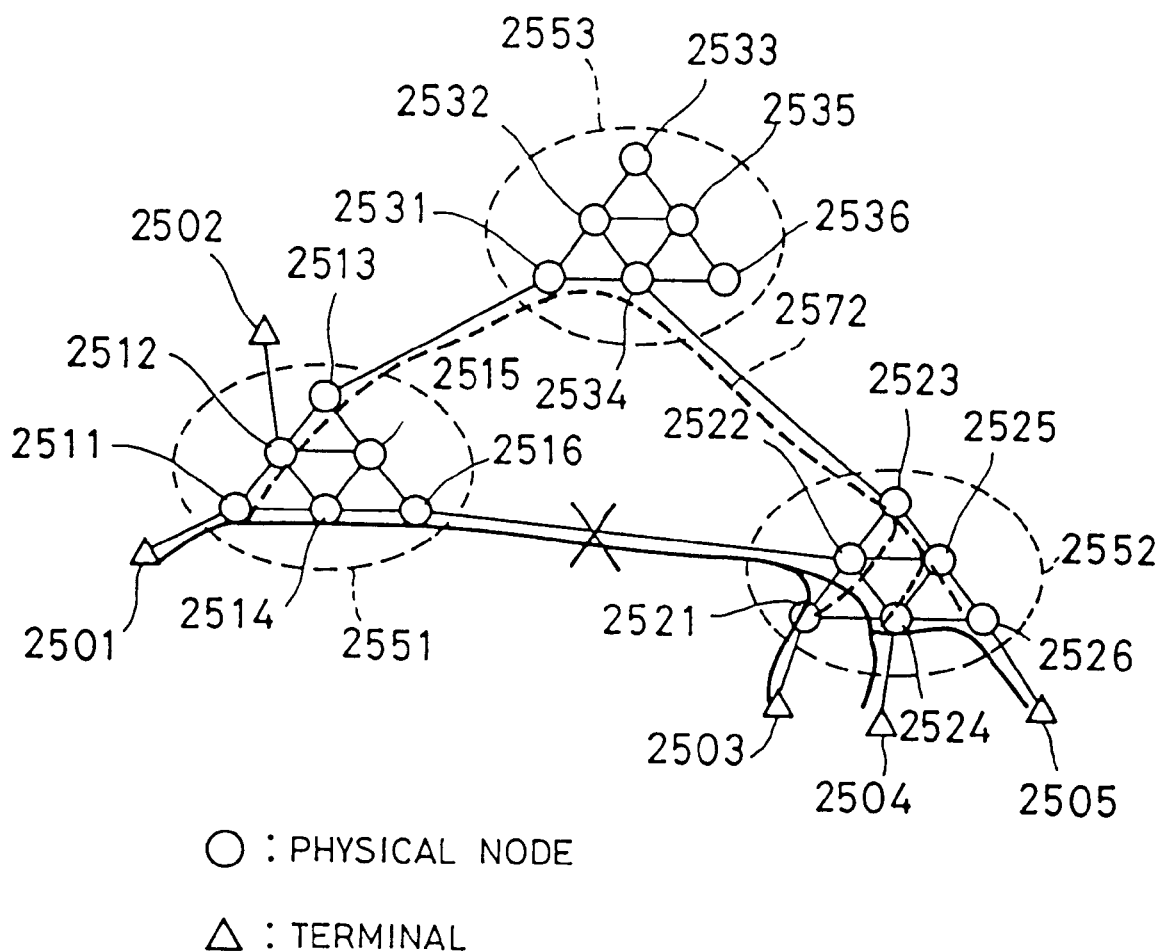
FIG. 21 is an illustration showing another example of recovery upon occurrence of failure in the network.
Figure 26:
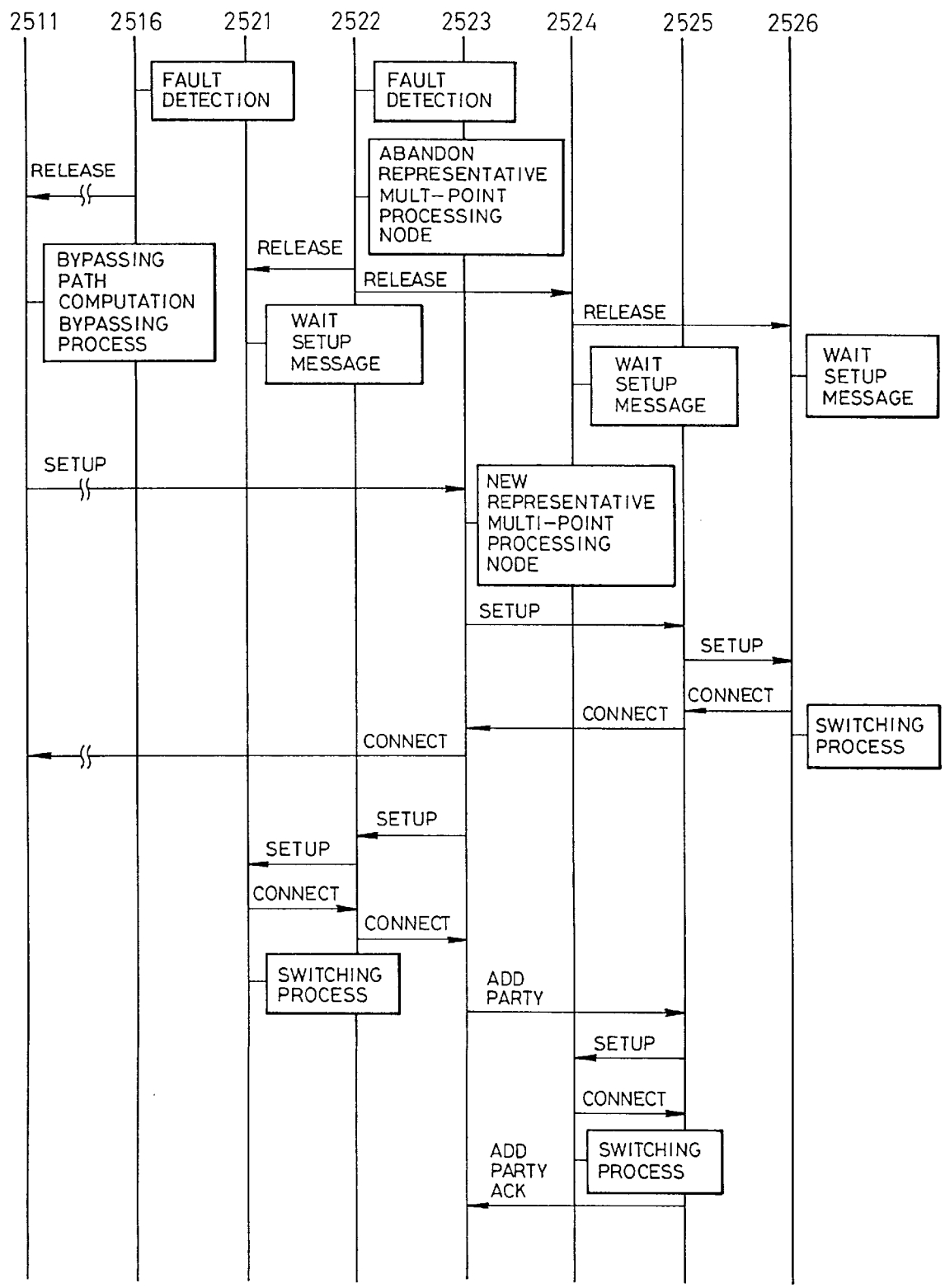
FIG. 26 is an illustration showing another example of a message flow of a switching process upon occurrence of failure.

Next, as shown in FIGS. 21 and 26, discussion will be given for the case where failure is caused in the link between the node 2516 and the node 2522.

When failure is caused in the link between the node 2516 and the node 2522, at first, the nodes 2516 and 2522 detects occurrence of failure in the link therebetween. In the node 2522, it becomes impossible to use connection due to failure. Then, the node becomes not the representative multi-point process node. Then, to the directions of all destination terminals, to which connection is present, the Release message due to occurrence of failure is transmitted. Finally, the Release message is noticed to respective exit border nodes. Then, arrival of Setup message or Add Party message is waited.

On the other hand, the bypassing process judgment means 103 of the node 2516 makes judgment that the own node is the relay node to transmit the Release message indicative of the faulty portion in the direction toward the calling terminal. Then, finally, the Release message reaches the node 2511 as the starting point node. In the node 2511, the destination terminal information associated with the Peer Group 2552 due to occurrence of failure is identified by multi-point connection database 113 to compute bypass path up to respective destination terminals.

Since the starting point node 2511 only manages one destination terminal information for each Peer Group, the destination terminal 2505 is assumed as the destination terminal, information of which is managed by the starting point node 2511. Then, the path to the exit border node 2526 connected to the destination terminal 2505 is computed with excluding the faulty portion. The bypass path to be set at this time is the path 2572 in the shown case.

Then, the starting point node 2511 transmits the Setup message to the node 2512. This Setup message is sequentially transmitted. When the Setup message reaches the node 2523, the node 2523 becomes the representative multi-point processing node as being the entry node of the Peer Group 2552. When the Setup message reaches the exit border node 2526 connected to the destination terminal 2505, connection is recovered in the destination terminal 2505.

Thereafter, the node 2523 serving as the representative multi-point processing node performs recovery of other multi-point connection of the Peer Group with reference to the multi-point connection database preliminarily noticed from the node 2522. In the shown example, the content of the multi-point connection database indicates the destination terminals 2503, 2504 and 2505. Concerning the destination terminal 2505, recovery of connection is completed. Therefore, recovery is performed with respect to remaining destination terminals 2503 and 2504.

In the node 2523, path computation to the exit border node 2521 connected to the destination terminal 2502 is performed for recovery of connection by transmitting the Setup message. Subsequently, path computation to the exit border node 2524 connected to the destination terminal 2504 is performed for recovery of connection by transmitting the Setup message.

As set forth above, the fault recovery system according to the present invention achieves the following effects. The first effect is autonomic recovery upon occurrence of failure of multi-point connection. The reason is that by providing the information of the representative multi-point processing node to other nodes, condition of multi-point connection in the managed sub-network can be known.

Next, a further embodiment of the fault recovery system according to the present invention will be discussed with reference to the drawings.

Figure 29:
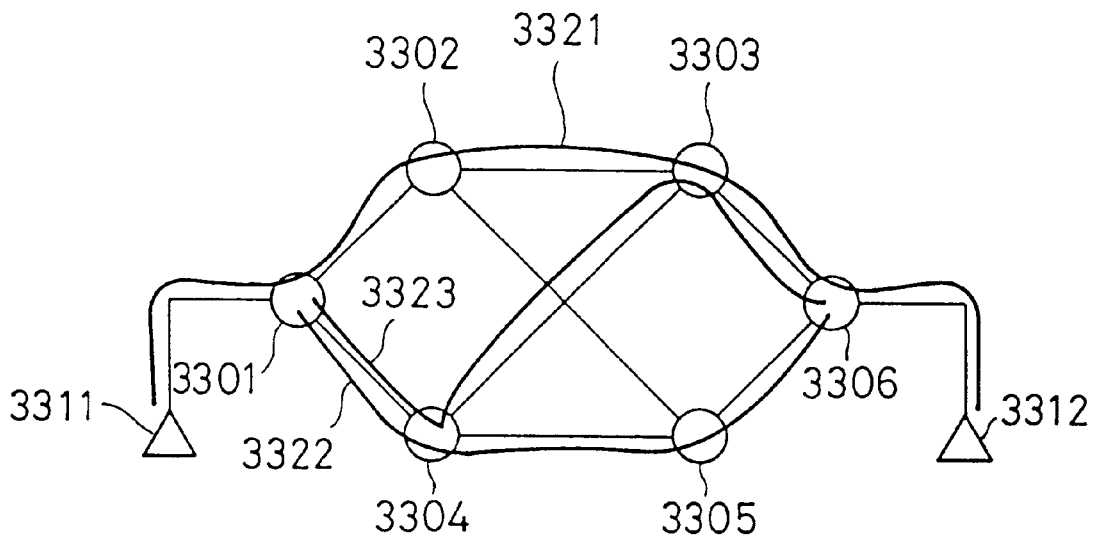
FIG. 29 is an illustration showing an example of construction of a network using the present invention.
Figure 30:
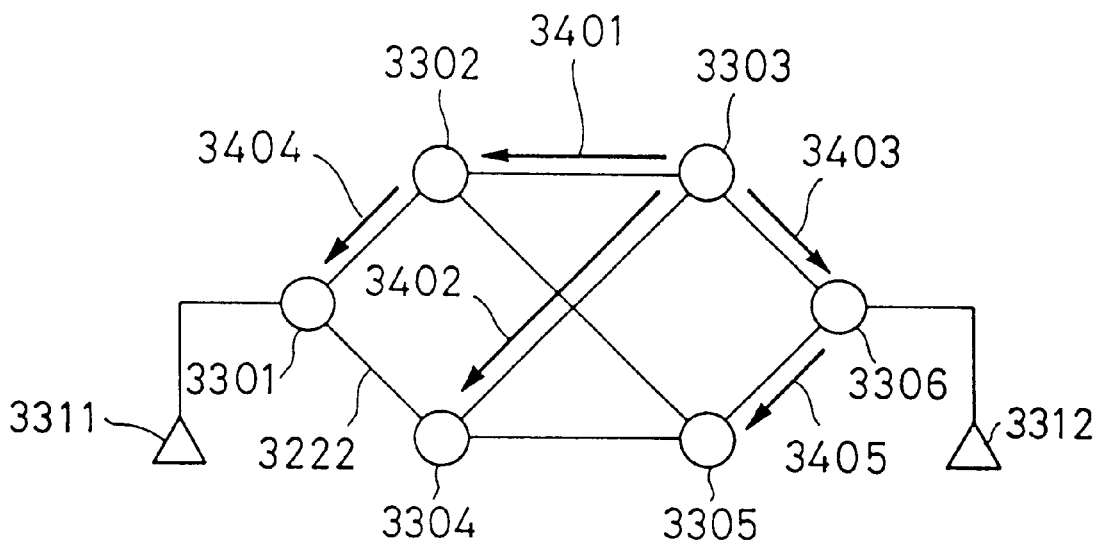
FIG. 30 is an illustration showing a flooding operation.

At first, discussion will be given with reference to FIG. 29. FIG. 29 shows an example for realizing the network using the protocol performing line connection using a source routing system performing path computation on the basis of the topology information exchanged between the nodes under ATM, in which is shown the network on the basis of PNNI protocol according to provision of ATM forum.

Here, the PNNI protocol concerns the routing technology for exchanging topology information of the network and the signaling technology for establishing connection.

FIG. 29 is consisted of six nodes (3301,3302,3303,3304, 3305, 3306). Respective nodes 3301–3302, 3301–3304, 3302–3303, 3302–3305, 3303–3304, 3303–3306, 3304–3305, 3305–3306 are, connected by links.

Figure 27:
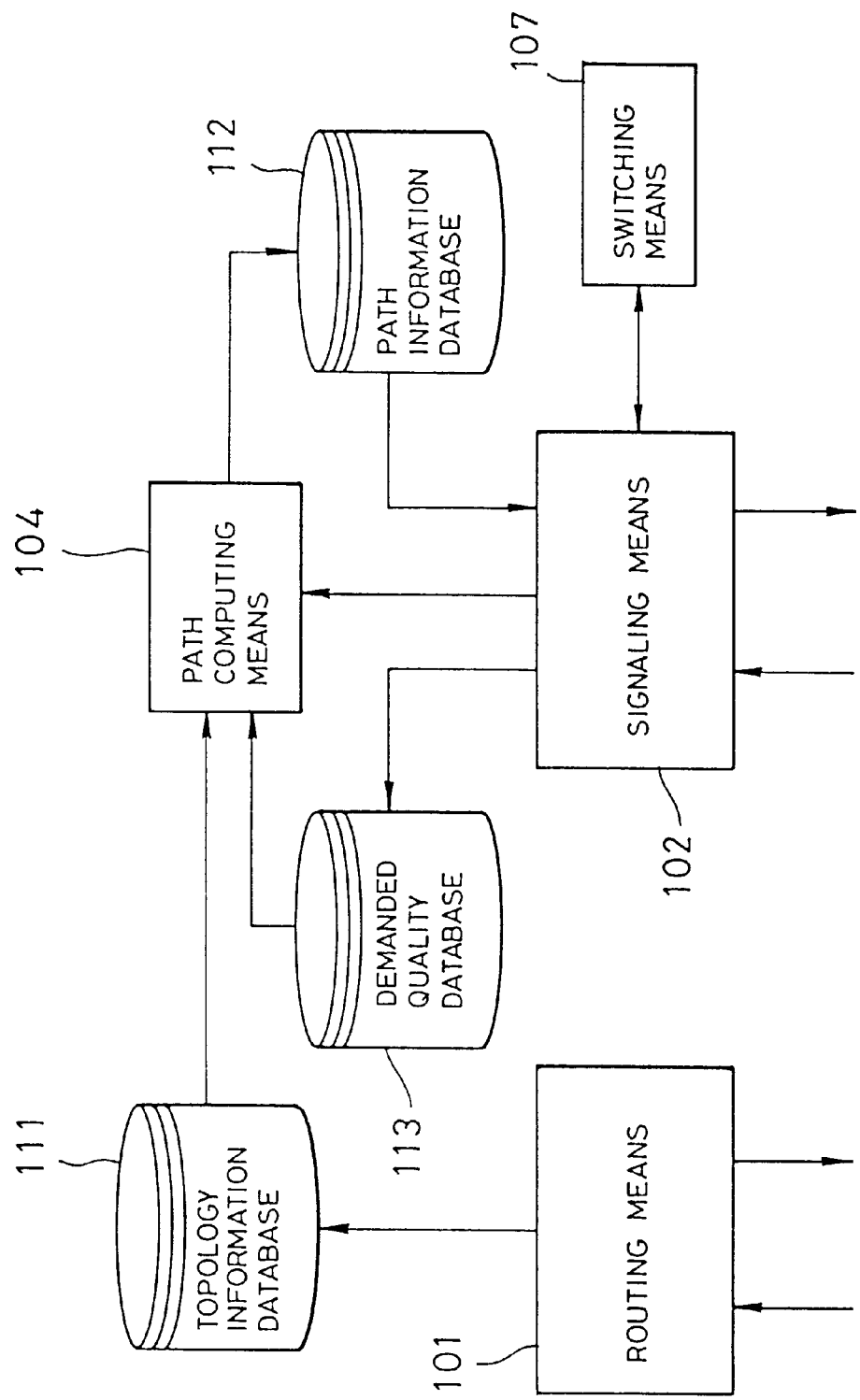
FIG. 27 is a block diagram of a still further embodiment of the fault recovery system according to the present invention.

Here, FIG. 27 is a functional block diagram showing the shown embodiment of the fault recovery system according to the present invention. In FIG. 27, major components provided in each node are illustrated. As shown, the node includes the routing means 101, the signaling means 102, the path computing means 104, the switching means 107, the topology information database 111, the path information database 112 and a demanded quality database 113.

The routing means 101 has the protocol having the same specification as the PNNI routing protocol defined in the foregoing ATM forum. The routing means 101 exchanges the topology information by exchanging the routing message between the own node and the adjacent nodes. When the exchanged topology information is different in content from the topology information database 111 of the own node, the content of the database is updated when judgment is made that updating is necessary under a provision. If flooding is required, flooding is performed.

The signaling means 102 generally performs the following two processes. One is the process for establishing and disconnecting the normal connection in response to a demand from the terminal. The other is the process for disconnecting and re-establishing the connection upon occurrence in the network. Since process functions are differentiated depending upon positions of the nodes in the connection path, the representative multi-point process will be discussed separately for the entry node, the exit border node and other nodes (repeat nodes).

At first, discussion will be given for processing of establishing and disconnecting connection in response to the demand from the calling terminal as the first process of the signaling means 102.

In the starting point node, upon reception of the Setup message concerning establishing of path from the calling terminal, the signaling means 102 sends a notice to the path computing means 104 that path computation is necessary.

On the other hand, a demanded quality information as the content of the Setup message is set in the demanded quality database 113. The signaling 102 performs connection process for connection in own node on the basis of the path information of the path information database 112 set by the path computing means 104. In conjunction therewith, the signaling means 102 transmits the Setup message for the node as next destination for connection on the path identified by the path information.

Then, in the repeat node and the exit border node, when the Setup message is received, connection process for connection with the own node is performed. In conjunction therewith, the Setup message is transmitted to establish connection to the next node or the destination terminal on the basis of the path information within the setup message.

On the other hand, in all of the nodes, upon reception of the Release message concerning disconnection of the path in response to the demand from the terminal, the Release message is transmitted to the next node on the path. In conjunction therewith, disconnecting process for the corresponding connection of the own node.

Next, discussion will be given for the process operation upon disconnecting and re-establishing connection upon occurrence of failure in the network, as the second process.

At first, in the starting point node, when failure is detected, a notice indicating that path computation is necessary, is send to the path computing means 104 with maintaining connection with the calling terminal. The signaling means 102 performs connection process for establishing connection in the own node on the basis of the path information in the path information database 112 set by the path computing means 104. In conjunction therewith, for the next node on the path information, the Setup message is transmitted to establish connection. As soon as connection is established, switching is requested to the switching means 107.

The signaling means 102 in the repeat node performs connection process for connection of the own node upon reception of the Setup message for establishing bypass path. In conjunction therewith, the signaling means 102 of the repeat node transmits the Setup message for establishing connection to the next node on the basis of the path information in the Setup message.

The signaling means 102 in the exit border node, upon reception of the Setup message for establishing the bypass path, the switching between the established path and the currently used path.

On the other hand, upon transmission of the message, the message is transmitted with adding the connection identifier unique in the network.

The path computing means 104 performs path computation wit reference to the address of the destination terminal and the topology information database 111. As an example of method of path computation, utilizing Dijkstra algorithm for computing the shortest path, computation is performed in consideration of demanded quality of the demanded quality database 113 to set the result in the path information database 112. At this time, it is not necessary to be the same quality as that of the currently used connection.

The switching means 107 performs switching between the connection of the currently used path and the connection derived through the path computation. In practice, switching is performed by establishing connection between the newly derived connection and the connection with the terminal. On the other hand, correspondence of the connections to be connected upon switching is determined with reference to the connection identifier.

Figure 28:
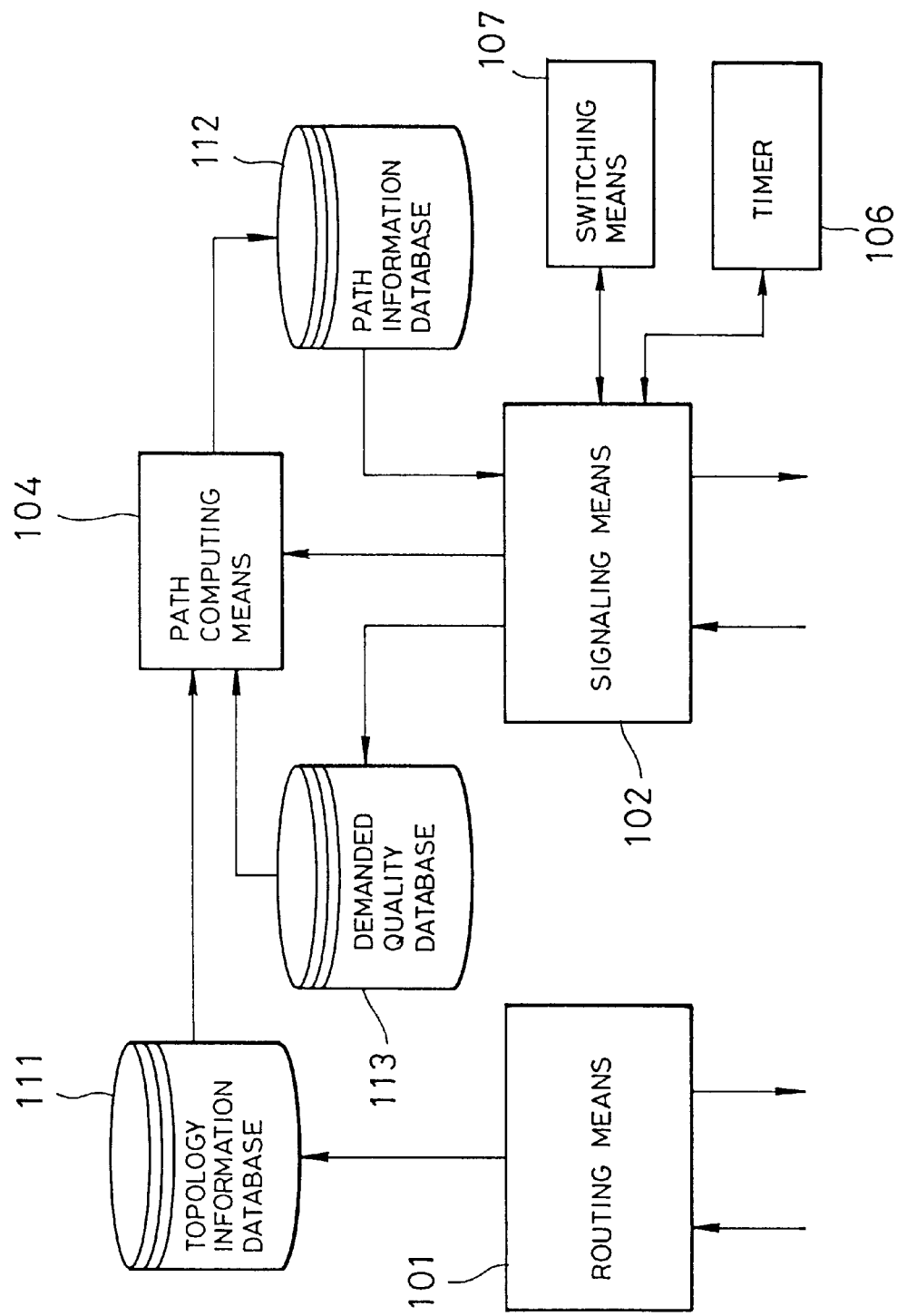
FIG. 28 is a block diagram of a yet further embodiment of the fault recovery system according to the present invention.

FIG. 28 is a functional block diagram showing a yet further embodiment of the fault recovery system according to the present invention. As shown, the shown embodiment of the fault recovery system is constructed by adding a timer means 106 for the system shown in the block diagram of FIG. 27. By adding the timer, the process of the signaling means 102 becomes as follows.

In the signaling means 102, in addition to the process discussed with respect to FIG. 27, setting of connection for switching is performed on the basis of the timer means 106. By notifying from the timer 106, retrieval of the paths with better quality is regularly performed within the range of demanded quality in connection with the currently used connection. It should be noted that the node to perform this process may be the starting point node.

Figure 31:
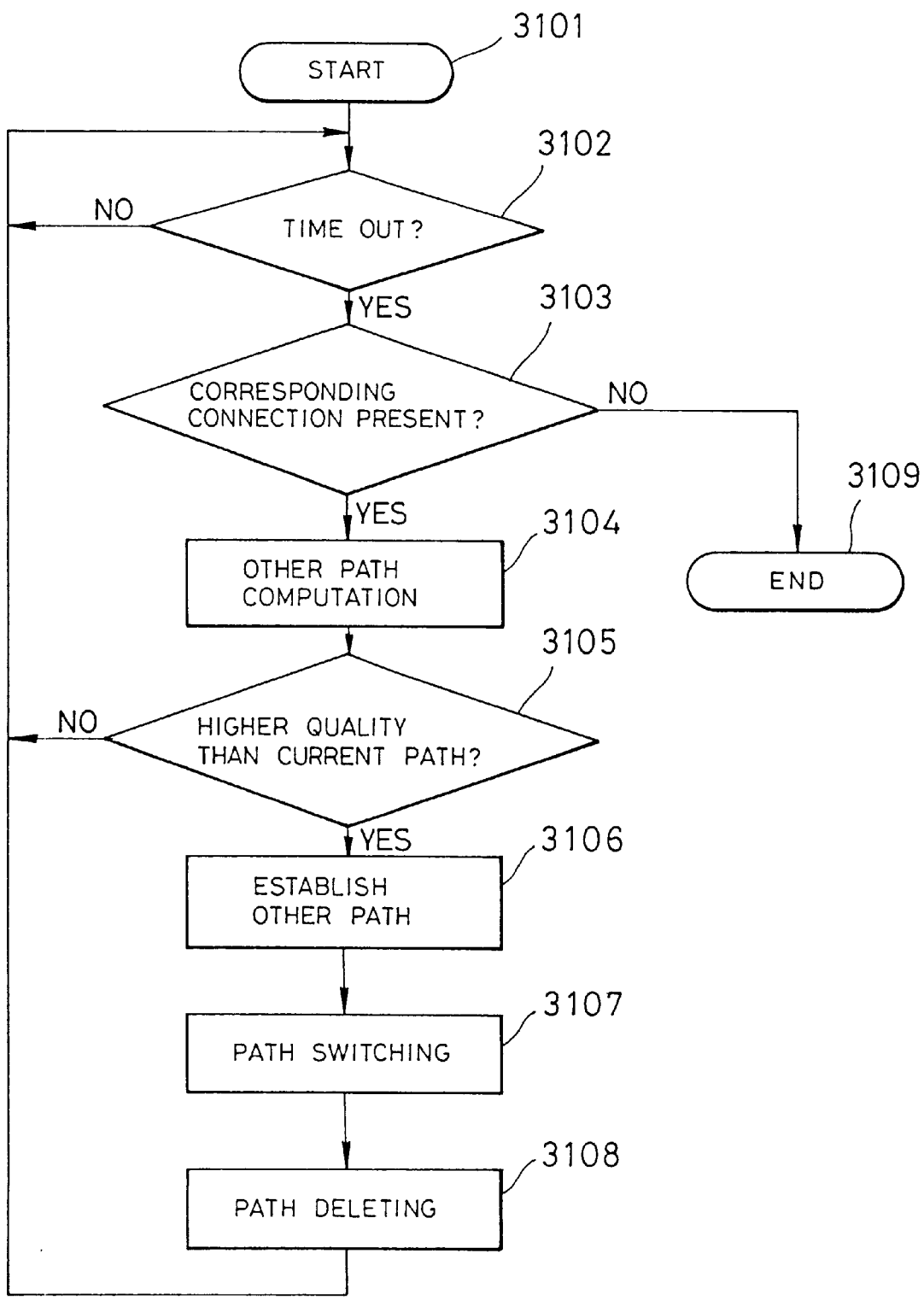
FIG. 31 is a flowchart showing an operation of the blocks in FIG. 28.

Namely, after receiving notice of regular timing by the timer means 106, retrieval of good quality of path is requested for the path computing means 104 with respect to the currently used connection. When new path can be retrieved, the Setup message for bypass path is transmitted. After establishing path, switching is requested to the switching means 107. As an example of process to be performed at this time, the process as shown in FIG. 31.

At first, at process 3102, it is known whether the timer 106 causes time out or not. When the timer 106 causes time out, check is performed whether corresponding connection is present, at the next process 3103. Here, if the connection used is disconnected, the process is terminated. If connection is stilled present, computation of other path is performed in the process 3104. This is requested to the path calculating means 104.

By the path information database 112, in which the result of computation is stored, another path information is obtained. Then, the quality of connection as currently used and the quality of another path are compared in the process 3105. If another path achieves better quality, the Setup message for another path is transmitted in the process 3106 for establishing connection.

After establishing connection, switching is performed in the process 3107. In the process 3108, connection of the path as originally used is disconnected. On the other hand, if the quality of another path is lower, process returns to the process 3102.

Thus, another path of the currently present connection per a certain period is computed. The path having better quality than that of the current path can be retrieved, path switching process is performed.

Figure 32:
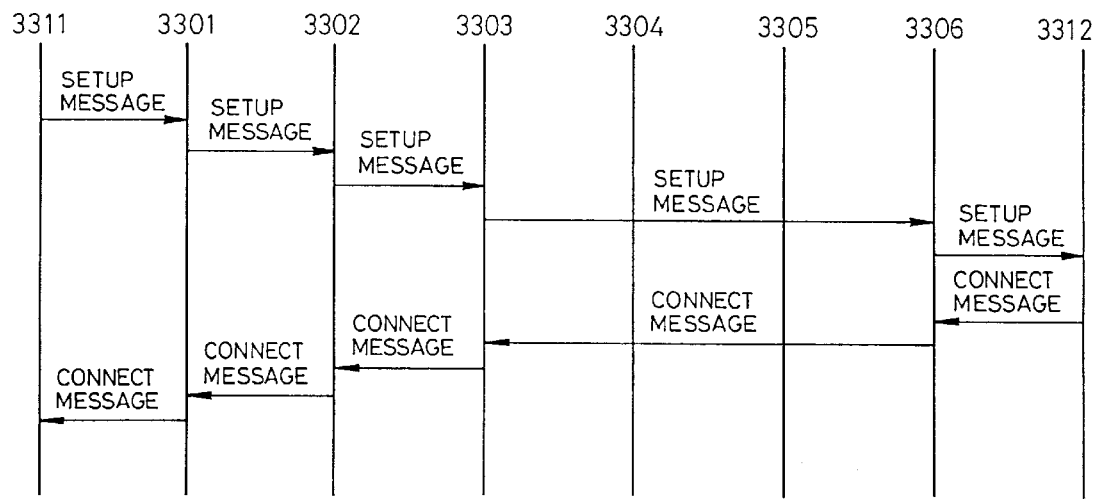
FIG. 32 is an example of a flow of message in connection setting.
Figure 33:
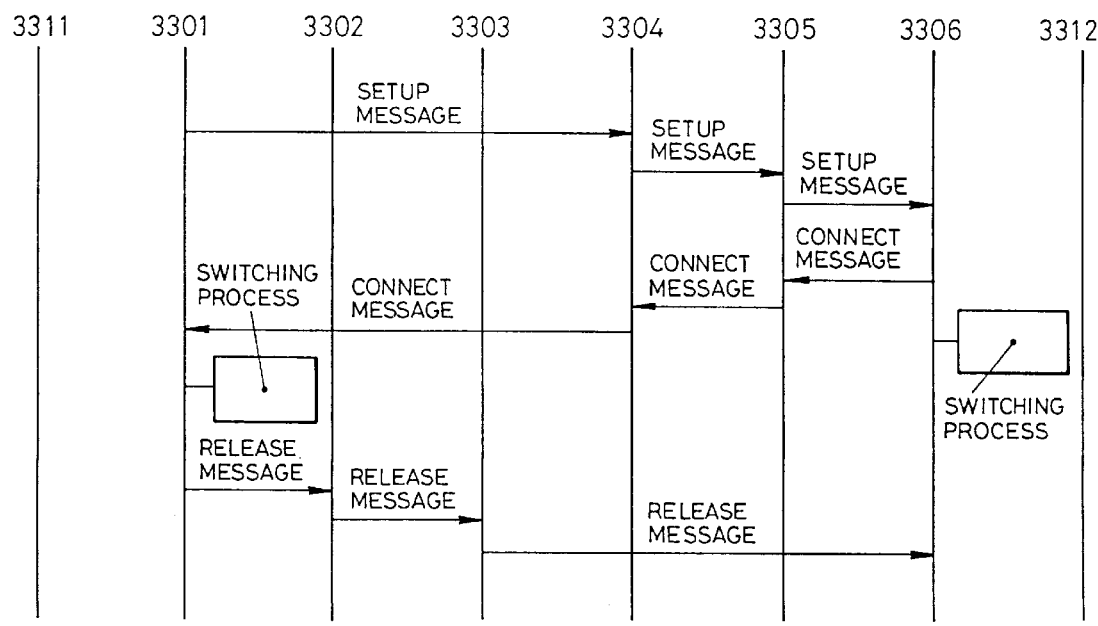
FIG. 33 is an example of a flow of message of a switching process upon occurrence of failure.

Next, discussion will be given for the operation of the overall process in the shown embodiment utilizing the ATM network of FIG. 29, with reference to FIGS. 32 to 34.

At first, in FIG. 32, discussion will be given for the case where the calling terminal 3311 newly establish connection with the destination terminal 3312. The operation at this time, is that the Setup message is transmitted to the node 3301 to be the starting point node from the calling terminal 3311. The signaling means 102 of the node 3301 receiving the Setup message obtains path information requested to the path computing means 104. As an example, a path 3231 is established through the nodes 3301, 3302, 3303 and 3306 in sequential order.

On the basis of the path information, the signaling means 102 of the node 3301 transmits the Setup message to the node 3302 as the next node. The node 3302 is the repeat node. Therefore, the signaling means of the node 3302 performs connection establishing process to transmit the Setup message to the node 3303 as the next node.

Similar process is performed in the node 3303. On the other hand, in the node 3306 as the exit border node, similarly, connecting establishing process is performed to transmit the Setup message to the destination terminal 3312. In the destination terminal 3312, when the Setup message is received, connection process is performed. As soon as completion of connection, a Connect message is transmitted up to the calling terminal 3311.

Associating therewith, the Connect message is noticed in the order of nodes 3306, 3303, 3302 and 3301. Finally, establishment of connection is noticed to the calling terminal 3311.

Next, discussion will be given for operation upon occurrence of failure with reference to FIG. 33. When failure is caused in the link between the nodes 3302 and 3303, the notice is transmitted to the starting point node 3301 and the exit border node 3306. The signaling means 102 of the starting point node 3301 thus detect occurrence of failure to request path computation excluding the faulty portion to the bypass path computing means 104 of the own node.

At this time, in the bypass path computing means 104, path computation is performed on the basis of the demanded quality information of the demanded quality database having a certain range. Then, on the basis of the obtained path information, establishment of connection is performed. As an example, it is assumed that a path 3322 through the nodes 3301, 3304, 3305, 3306 in sequential order, is obtained. In this case, the signaling means 102 of the node 3301 transmits the Setup message to the next node 3304 on the basis of the path information.

The node 3304 as the repeat node performs connection establishing process in the signaling means 102 to transmit the Setup message to the node 3305 as the next node on the path. The node 3305 performs the process similar to that in the node 304.

The exit border node 3306 performs switching of connection by the switching means 107 upon reception of the Setup message. Then, the Connect message as response to the Setup message is noticed to the nodes 3305, 3304, 3301 in sequential order. Then, in the starting point node, switching of connection is performed.

Then, in order to disconnect originally used connection path, for the node 3302 as next node in the original connection, the Release message is transmitted. Similarly, the Release message is transmitted to the nodes 3303, 3308 in sequential order, to finally disconnect the original path.

On the other hand, the operation upon retrieval of the better quality path will be discussed with reference to FIG. 34. In the starting point node 3301, path computation is regularly performed by the path computing means 104 for different paths having better quality for the path 3322, by the timer means 106. Then, obtained path has better quality than that of the current path, switching process is performed. For example, path information of the nodes 3301, 3304, 3303 and 3306 in sequential order can be obtained.

In this case, the signaling means of the node 3301 transmits the Setup message to the next node 3304 on the basis of the path information. Since the node 3304 is the relay node, establishment process for connection is performed by the signaling means 102 to transmit the Setup message to the node 3303 as the next node. The similar process is performed in the node 3303.

In the exit border node 3306, when the message is received, switching of connection is performed by switching means 107. Then, the Connect message as a response to the Setup message is noticed to the nodes 3303, 3304 and 3301 in sequential order. In the starting point node 3301, switching of connection is performed. Then, in order to disconnect originally used connection path, the Release message is transmitted to the node 3302 as the next node on the path of connection. The Release message is similarly transmitted to the nodes 3303 and 3308. Finally, the original path is disconnected.

Hereinafter, as an example of quality demand information, the operation of the particular embodiment will be discussed using the use band.

When it is demanded by the calling terminal that it is desired to establish line connection at 40 Mbit/S but the quality of connection has to be 20 Mbit/S at the minimum, the Setup message is transmitted to the starting point node with adding these two information. In the transmission node, these information are stored in the demanded quality database. The transmission node has to establish connection by this Setup message. Thus, path satisfying the demanded quality is retrieved on the basis of the topology information database established by the routing means. It is assumed that the content of useful remaining band of the topology information is as shown in FIG. 35.

When the path resulting from the shortest path computation by Dijksta algorithm is 3301–3302–3303–3306, the use band to be given for the connection becomes 30 Mbit/S as the minimum value of this path. On the basis of this value, connection is established up to the exit border node. Namely, concerning the portions indicated with the mark * in the table, 30 Mbit/S will be occupied in each node, the values becomes those subtracted 30 Mbit/S.

Figures 34, 35:
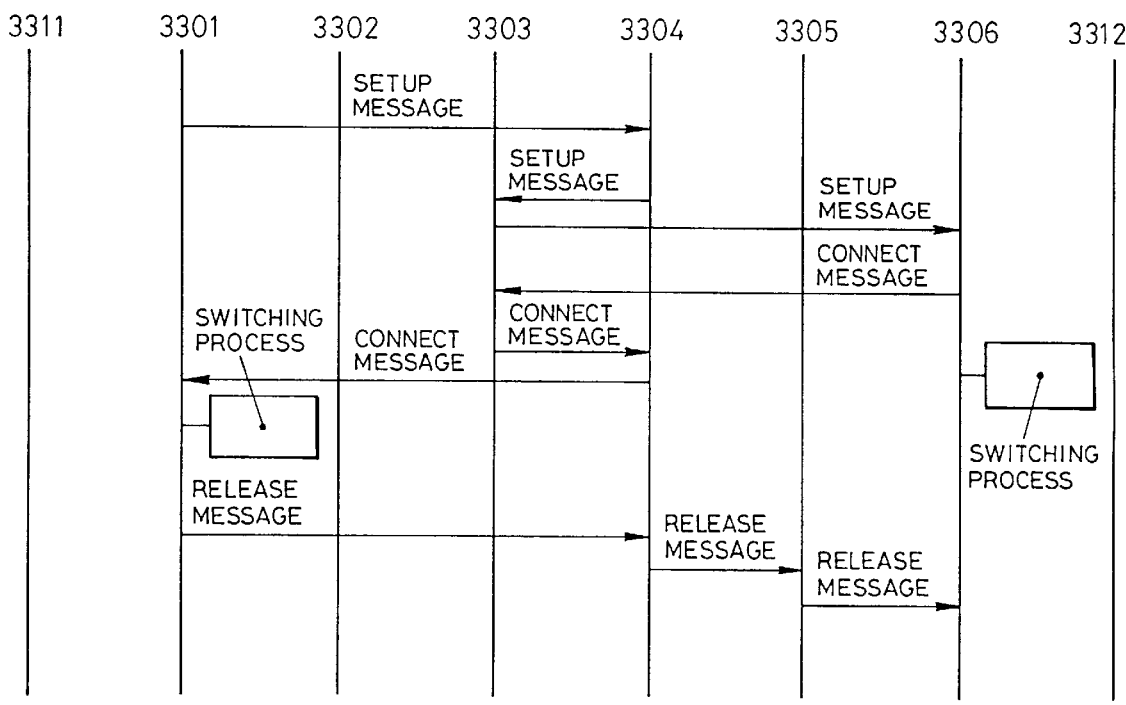
FIG. 34 is an example of flow of switching process when a path of better quality is retrieved.
FIG. 35 is an example showing one example of a content of a demanded quality database of FIGS. 27 and 28.

The table shown in FIG. 35 is updated from time to time by the routing means as varied by establishing and disconnecting of connection.

Here, when failure is caused in the link between the nodes 3302 and 3303, computation according to Dijkstra algorithm excluding the faulty link is performed. At this time, the computed path is 3301–3304–3305–3306. In this case, the use band becomes 20 Mbit/S according to FIG. 35. Thus, the quality of connection becomes lower than 30 Mbit/S of the original connection. However, in view of the content of the demanded quality data base, it can be appreciated that the required quality of connection is in a range of 20 to 40 Mbit/S. Thus, even with the computed path, the demanded quality can be satisfied. Therefore, the Setup message for utilizing this path is transmitted.

On the other hand, the condition of the network is varied to vary the link between the nodes 3303 and 3304 to be 100 Mbit/S. Then, in the starting point node, the shortest path is derived by using the path partly excluding the current path. At this time, as the shortest path of 3301–3304–3303–3306 is computed. Then, on the basis of the table of FIG. 35, 50 Mbit/S can be certainly obtained. On the other hand, since the demanded quality is in a range of 20 to 40 Mbit/S in the light of the demanded quality database, connection is established with obtaining 40 Mbit/S as the maximum demanded quality. Then, after establishing connection, the connection with better quality can be established by switching.

As set forth above, by the autonomic switching system set froth above, the following effect can be achieved. The first effect is that the bypass path can be flexibly retrieved upon occurrence of failure. When better quality of path can be provided in the bypass path, the path is provided. On the other hand, it becomes possible to improve certainty of retrieval of the bypass path. The reason is that, upon retrieval of the bypass path, the path retrieval can be performed with the width of the quality demanded by the terminal.

The second effect is that better quality of connection can be provided for the user using the connection. The reason is that by regularly performing other path computation, and when the path obtained through computation achieved better quality than the current path, the path can be switched.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A fault recovery system in a connection oriented network employing a protocol establishing line connection using a source routing system which performs path computation on the basis of a topology information exchanged between nodes, for establishing a path bypassing a failure upon occurrence of failure in connection used in said network, said nodes comprising:
   first release message receiving means for receiving a release message generated upon occurrence of failure;
   bypassing process judgment means for making judgment whether a bypassing process is primarily performed by a first node or not, depending upon a relationship of positions of a faulty portion, indicated in said release message, and said first node;
   path computing means for performing path computation excluding said faulty portion when said bypassing process judgment means makes judgment that said bypassing process, in which said first node becomes a master, is to be performed;
   setup message transmitting means for transmitting a setup message added an information of said faulty portion, for establishing a bypass path on the basis of bypass path information obtained by said path computing means when said bypassing process judgment means makes judgment that said bypassing process, in which said first node becomes a master, is to be performed;
   switching means for performing switching by connecting said bypass path established by said setup message and a path in a direction toward a terminal not causing failure from said first node; and
   first release message transmitting means for abandoning said release message in responsive to completion of switching by said switching means, and for transmitting said release message in a direction toward a terminal when switching is not completed.

2. A fault recovery system as set forth in claim 1, wherein said nodes further comprise:
   second release message transmitting means, provided in place of said first release message transmitting means, for transmitting a release message with information indicative of on going state of switching by adding a content that said first node is in process for switching, to said release message when said release message is received, and transmitting a result message indicative of the result of switching process by said switching means of said first node; and
   second release message receiving means for receiving said release message with the information indicative of on going state of switching or said result message, said switching process being performed by computing a bypass path by said path computing means for preparation to switching upon reception of said release message with the information indicative of on going state of switching, transmitted from other node, and upon reception of said result message indicating that switching is not completed.

3. A fault recovery system in a connection oriented network employing a protocol establishing line connection using a source routing system which performs path computation on the basis of a topology information exchanged between nodes, for establishing a path bypassing a failure upon occurrence of failure in connection used in said network, said nodes comprising:
first setup message receiving means for receiving a release message generated upon occurrence of failure or a setup message added information of a faulty portion;
bypassing process judgment means for making judgment whether a bypassing process is to be primarily performed by a first node or not depending upon a relationship of positions of a faulty portion indicated in said received message and said first node;
a timer to be triggered when said release message is received and said setup message is node received and stopped upon reception of said setup message;
connection state judgment means for making judgment whether a connection, in which failure is caused, is remained in said first node when said timer is not time out and said setup message is received;
switching means for performing switching by connecting said bypass path established by said setup message and a path in a direction toward a terminal not causing failure from said first node when said connection state judgment means makes judgment that the connection causing failure is remained; and
third release message transmitting means for transmitting said release message in responsive to time out of said timer, and for abandoning said release message when said timer is not cause time out.

4. A fault recovery system as set forth in claim 3, wherein said nodes further comprises fourth release message transmitting means for transmitting the release message to the path in a direction of occurrence of failure of connection where failure is caused when switching by said switching means is completed.

5. A fault recovery system as set forth in claim 3, wherein an address of a node, to which a destination terminal of connection is connected, is held upon establishing a connection demanded from a calling terminal.

6. A fault recovery system as set forth in claim 5, wherein a plurality of switching portions for switching failure upon occurrence of failure of connection are provided and reconnection is established with the destination terminal, to which connection is established before occurrence of failure.

7. A fault recovery system in a connection oriented network employing a protocol establishing line connection using a source routing system which performs path computation on the basis of a topology information exchanged between nodes, for establishing a path bypassing a failure upon occurrence of failure in a multi-point connection for establishing connection for a plurality of terminals, said nodes comprising:
management judgment means for making judgment whether management of terminals involved in multi-point connection under management of a first node, upon setting of multi-point connection;
a database storing a management information when judgment is made that management is to be performed by said management judgment means;
notifying means for notifying a management information of said database to nodes to be candidate for performing management of other terminals involved in multi-point;
bypassing process judgment means for making judgment whether a bypassing process is to be performed by said first node or not depending upon a relationship of positions of a faulty portion and said first node;
path computing means for performing path computation excluding said faulty portion for connection managed by said first node on the basis of information held in said database when said bypassing process judgment means makes judgment that said bypassing process is to be performed;
path establishing means for establishing the bypass path on the basis of the bypass path information obtained by said path computing means when bypassing process is to be performed by said bypass process judgment means; and
switching means for performing switching between said bypass path and said path where failure is caused.

8. A fault recovery system as set forth in claim 7, wherein said nodes recover multi-point connection, in which failure is caused by said path computing means, said path establishing means and said switching means on the basis of information of said database when judgment is made to perform management by said management judgment means, in response to reception of message for bypass path setting.

9. A fault recovery system as set forth in claim 7, wherein said management judgement means makes judgement to perform management of the terminal involved in multi-point under management of said first node, when said first node is the node closest to the calling terminal on the connection in a node group as a predetermined local management unit.

10. A fault recovery system as set forth in claim 7, wherein said bypass process judgment means makes judgment to perform said bypass process when said first node is a starting point node or when said first node is located between said faulty portion and said calling terminal.

11. An autonomic switching system of transmission path in a connection oriented communication network using a protocol performing line connection using a source routing system performing path computation on the basis of topology information exchanged between nodes, wherein said nodes comprise:

demanded quality holding means for holding demanded quality information having a predetermined range of quality demanded by a terminal upon setting of connection;
path computing means for computing bypass path having a quality within a demanded quality range held by said demanded quality holding means in response to occurrence of connection failure; and
switching means for switching to a bypass path obtained by said path computing means.

12. An autonomic switching system of transmission path as set forth in claim 11, wherein said nodes further comprise means for retrieving a path having better quality than the path on use within a range of quality demanded by said terminal by triggering said path computing means at every predetermined period, to switch the retrieved oath by said switching means when path can be retrieved.

13. An autonomic switching system of transmission path as set forth in claim 11, wherein said quality is an information indicative of transmissible band of the path.

* * * * *

UNITED STATES PATENT AND TRADEMARK OFFICE
CERTIFICATE OF CORRECTION

PATENT NO.: 6,122,753
DATED: September 19, 2000
INVENTOR(S): Hitoshi MASUO, Atsushi IWATA It is certified that error(s) appears in the above-identified patent and that said Letters Patent is hereby corrected as shown below:

In the Foreign Application Priority Data, delete the "8" insert --9-- in all three occurrences.

Column 26, line 46, after "path," insert --requests the switching means 107 to perform--.

Signed and Sealed this

First Day of May, 2001

Attest:

NICHOLAS P. GODICI

*Attesting Officer*   *Acting Director of the United States Patent and Trademark Office*